(12) United States Patent
Wei et al.

(10) Patent No.: US 12,451,510 B2
(45) Date of Patent: Oct. 21, 2025

(54) TRAY AND METHOD FOR USING SAME, AND BATTERY PRODUCTION APPARATUS

(71) Applicant: CONTEMPORARY AMPEREX TECHNOLOGY (HONG KONG) LIMITED, Hong Kong (CN)

(72) Inventors: Guojie Wei, Fujian (CN); Zhihui Wang, Fujian (CN); Fangyu Huang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 88 days.

(21) Appl. No.: 18/218,586

(22) Filed: Jul. 6, 2023

(65) Prior Publication Data

US 2024/0186563 A1 Jun. 6, 2024

Related U.S. Application Data

(63) Continuation of application No. PCT/CN2022/136689, filed on Dec. 5, 2022.

(51) Int. Cl.
*H01M 10/00* (2006.01)
*H01M 10/04* (2006.01)
(Continued)

(52) U.S. Cl.
CPC ... *H01M 10/0481* (2013.01); *H01M 10/0404* (2013.01); *H01M 50/471* (2021.01); *H01M 50/48* (2021.01)

(58) Field of Classification Search
CPC ......... H01M 10/0481; H01M 10/0404; H01M 50/471; H01M 50/48
See application file for complete search history.

(56) References Cited

U.S. PATENT DOCUMENTS

| 10,193,181 B2 | 1/2019 | Niwa et al. |
| 2011/0052960 A1* | 3/2011 | Kwon ............... H01M 10/0481 429/120 |

(Continued)

FOREIGN PATENT DOCUMENTS

| CN | 106133944 A | 11/2016 |
| CN | 207818692 U | 9/2018 |

(Continued)

OTHER PUBLICATIONS

Machine translation of JP 2010238554 A, obtained Jun. 2024 (Year: 2010).*

(Continued)

*Primary Examiner* — Nicholas P D'Aniello
(74) *Attorney, Agent, or Firm* — XSENSUS LLP

(57) ABSTRACT

The present application discloses a tray and a method for using same, and a battery production apparatus. The tray may be configured to carry a battery cell. The tray may include a tray body and a plurality of pressing bodies. The plurality of pressing bodies may be arranged at intervals in a first direction. The pressing bodies may be arranged on the tray body, the battery cell may be placed between two adjacent pressing bodies, each of the pressing bodies may be provided with a flexible pressing portion, and the flexible pressing portion may be configured to be in contact with the battery cell so as to press the battery cell.

17 Claims, 13 Drawing Sheets

(51) Int. Cl.
*H01M 50/471* (2021.01)
*H01M 50/48* (2021.01)

(56) References Cited

U.S. PATENT DOCUMENTS

| | | | | |
|---|---|---|---|---|
| 2011/0104545 | A1* | 5/2011 | Meintschel | H01M 10/6557 429/120 |
| 2013/0022855 | A1* | 1/2013 | Hsiao | H01M 50/224 429/120 |
| 2014/0120391 | A1* | 5/2014 | Park | H01M 50/271 429/72 |
| 2017/0133705 | A1 | 5/2017 | Niwa et al. | |
| 2020/0350530 | A1* | 11/2020 | Kim | H01M 50/262 |
| 2021/0273289 | A1* | 9/2021 | Torres | H01M 50/367 |
| 2022/0384920 | A1* | 12/2022 | Hidaka | H01G 11/10 |
| 2023/0369686 | A1* | 11/2023 | Puglia | H01M 50/264 |

FOREIGN PATENT DOCUMENTS

| | | |
|---|---|---|
| CN | 218002765 U | 12/2022 |
| EP | 3121868 A1 | 1/2017 |
| JP | 2010238554 A | 10/2010 |
| JP | 2018098082 A | 6/2018 |
| JP | 2018198112 A | 12/2018 |
| KR | 20150050223 A | 5/2015 |
| KR | 20160142490 A | 12/2016 |
| KR | 20170111614 A | 10/2017 |

OTHER PUBLICATIONS

International Search Report issued Jul. 29, 2023 in International Patent Application No. PCT/CN2022/136689 with English translation thereof, 8 pages.
Written Opinion of International Searching Authority issued Jul. 29, 2023 in International Patent Application No. PCT/CN2022/136689 with English translation thereof, 10 pages.
Extended European Search Report issued Jul. 19, 2024 in European Patent Application No. 22905458.0.

* cited by examiner

TRAY AND METHOD FOR USING SAME, AND BATTERY PRODUCTION APPARATUS

CROSS-REFERENCE TO RELATED APPLICATION

The present application is a continuation of International Application No. PCT/CN2022/136689, filed Dec. 5, 2022, which is incorporated herein by reference in its entirety.

TECHNICAL FIELD

The present application relates to the technical field of battery production, and in particular to a tray and a method for using same, and a battery production apparatus.

BACKGROUND ART

In a lithium ion battery production technology, a formation process, which is a very important step, is mainly a process of charging a battery cell for the first time so as to activate a lithium ion battery. During this process, a solvent and a lithium salt in an electrolyte solution undergo a side reaction, so that a layer of solid electrolyte interphase (SEI) film is formed at a negative electrode of the lithium ion battery, while the solvent and some additives in the electrolyte solution are reduced or decomposed to cause severe gas generation inside the battery. If a gas generated during formation cannot be discharged in a timely manner, bubbles will be formed between a positive electrode and the negative electrode, affecting intercalation and deintercalation of lithium ions at the positive electrode and the negative electrode, and thus affecting the electrical performance of the battery.

SUMMARY OF THE DISCLOSURE

One of the objectives of embodiments of the present application is to provide a tray and a method for using same, and a battery production apparatus, in order to solve the technical problem of poor exhaust of batteries.

The embodiments of the present application adopt the following technical solutions.

In a first aspect, provided is a tray configured to carry a battery cell. The tray comprises: a tray body; and a plurality of pressing bodies arranged at intervals in a first direction, wherein the pressing bodies are arranged on the tray body, the battery cell is placed between two adjacent pressing bodies, and each of the pressing bodies is provided with a flexible pressing portion configured to be in contact with the battery cell so as to press the battery cell.

The tray body is provided with a plurality of pressing bodies arranged at intervals in the first direction, so that when the tray is in use, the battery cell is placed between two adjacent pressing bodies, and the flexible pressing portions on the pressing bodies are in contact with the battery cell and flexibly press the battery cell; and when flexibly pressing the battery cell, the flexible pressing portions deform according to the shape of surfaces of the battery cell, decreasing the generation of dead space during pressing, improving the exhaust effect of the battery cell, decreasing the generation of black spots on an electrode interface, and reducing the risk of lithium precipitation.

In some embodiments, the pressing body comprises at least one deformable bladder, at least part of the bladder being formed as the flexible pressing portion.

By providing the bladders to press the battery cell, when the battery cell is being charged or discharged, the battery cell expands or contracts, and at the same time, the bladders are correspondingly deformed self-adaptively, so that the flexible pressing portions of the bladders always keep pressing on the surfaces of the battery cell, improving the group margin of the compressed battery cell S, and alleviating the crumpling phenomenon of a tab in the battery cell due to the volume change of the battery cell.

In some embodiments, the bladder is internally provided with a bladder cavity capable of being filled with a fluid medium, and the bladder is further provided with a bladder opening in communication with the bladder cavity.

By providing the bladder with the bladder cavity and the bladder opening, the volume of the bladder can be varied by using the bladder opening to adjust the amount of the fluid medium filled in the bladder cavity. In this way, when the tray is in use, it is possible to fill the bladder cavities with the fluid medium through the bladder openings only when the battery cell S needs to be pressed, to maintain the bladder cavities empty or to fill a small amount of fluid medium when the battery cell is loaded or unloaded, thereby facilitating removal and placement of the battery cell. In addition, it is also possible to adjust the amount of the fluid medium filled in the bladder cavities through the bladder openings, so as to adjust pressing forces of the bladders on the battery cell, and preventing the phenomenon that the battery cell is subjected to an excessively large force to cause poor appearance, such as depression of a shell, of the battery cell, or is subjected to an excessively small force to cause lithium precipitation. In addition, since the bladders can be self-adaptively deformed according to the shape of the surfaces of the battery cell, and the amount of the fluid medium filled in the bladder cavities can also be adjusted by means of the bladder openings, the compatibility of the tray for the thickness, shape, group margin, etc. of the battery cell is improved, and the uniformity of the forces applied to each battery cell is improved.

In some embodiments, the bladder comprises a rigid frame and a flexible skin for covering a frame opening on at least one side of the frame, wherein the frame and the flexible skin form the bladder cavity in an enclosing manner, and the flexible skin is formed as the flexible pressing portion.

By configuring the bladder to comprise the rigid frame and the flexible skin and by using the rigid frame as a framework, the flexible skin is supported and shaped, so that the flexible skin is kept open and stretched and is capable of being better in contact with and pressing the battery cell, decreasing the dead space during pressing. In addition, the rigid frame may also assist in mounting, or even the frame itself may be mounted as a connecting portion with the tray body, so as to improve the mounting convenience of the bladder.

In some embodiments, the bladder opening is formed in the frame and makes the bladder cavity open.

By forming the bladder opening in the rigid frame, the frame is not in direct contact with the battery cell S during pressing, so that it is possible to prevent the battery cell from blocking the bladder opening when the tray is in use, and the rigid frame is also used to shape the bladder opening, thereby facilitating docking with other components by means of the bladder opening, such as connection to an assembly for delivering a fluid medium, and promoting filling or discharging of the fluid medium.

In some embodiments, the tray further comprises a fluid delivery assembly in communication with the bladder cavity, wherein the fluid delivery assembly is arranged in the first direction.

Since the plurality of pressing bodies are arranged at intervals in the first direction, the fluid delivery assembly is correspondingly arranged in the first direction, and the fluid delivery assembly is in communication with the bladder cavities, so that the fluid medium flows into or out of each bladder cavity by means of the fluid delivery assembly.

In some embodiments, the fluid delivery assembly comprises a main channel and a plurality of sub-channels, wherein the plurality of sub-channels are each in communication with the main channel, and the sub-channels are in communication with the bladder cavities in one-to-one correspondence.

By providing the main channel and the plurality of sub-channels in communication with the main channel and by further configuring the plurality of sub-channels to communicate with the plurality of bladder cavities in one-to-one correspondence, one main channel can be in communication with all the plurality of bladder cavities, and the bladder cavities can be in communication with each other by means of the main channel and the sub-channels. By using the principle of communicating vessels, the pressing forces of the bladders on the battery cell can be balanced, and the uniformity of the forces applied to each battery cell can be improved. For example, when the pressing force of one bladder on the battery cell is excessively large, the fluid medium in the bladder cavity of the bladder flows out through the corresponding sub-channel and flows into the bladder cavities of other bladders through the main channel until the pressures in the bladder cavities are substantially the same, thereby balancing the pressing forces of the bladders on the battery cell.

In some embodiments, at least one end of the main channel is provided with a one-way valve.

By providing the one-way valve on the main channel, the fluid medium can only flow into the main channel through the one-way valve, but the fluid medium in the main channel cannot flow out through the one-way valve, so that even if the fluid medium is separated from a fluid medium source after the bladder cavities are filled with the fluid medium, the bladders can still continuously press the battery cell, thereby facilitating the transfer of the tray at different stations.

In some embodiments, the fluid delivery assembly is located on one side of the bladder in a second direction crossed with the first direction.

By arranging the fluid delivery assembly on one side of the bladder in the second direction, that is, by arranging the fluid delivery assembly and the bladder side-by-side in the second direction, it can be understood that the fluid delivery assembly is also arranged side-by-side with a carrying area located between two adjacent bladders and available for the loading of the battery cell, thereby preventing the carrying area from being occupied, which otherwise interferes with the placement of the battery cell.

In some embodiments, the tray further comprises a box, wherein the tray body is located in the box, and the fluid delivery assembly is located outside the tray body and fixed to the box.

By fixing the fluid delivery assembly to the box and locating the fluid delivery assembly outside the tray body, that is, by locating the bladder and the fluid delivery assembly respectively on inner and outer sides of the tray body, the fluid delivery assembly is prevented from interfering with the loading of the bladder and the battery cell.

In some embodiments, the tray body is provided with a receiving cavity, a receiving sub-cavity is further formed in the receiving cavity, the bladder is located in the receiving sub-cavity, and the fluid delivery assembly is fixed in the receiving cavity but located outside the receiving sub-cavity.

By providing the tray body with the receiving cavity, and by further providing the receiving cavity with the receiving sub-cavity, the bladder is located in the receiving sub-cavity, whereas the fluid delivery assembly is located outside the receiving sub-cavity, so that the bladder and the fluid delivery assembly are respectively located on inner and outer sides of the receiving sub-cavity, preventing the fluid delivery assembly from interfering with the loading of the bladder and the battery cell.

In some embodiments, the tray body avoids the bladder opening.

By configuring the tray body to avoid the bladder opening, the bladder opening is in an exposed state, and operations of delivering and transferring the fluid medium through the bladder opening are thus facilitated.

In some embodiments, the bladder opening is higher than the tray body.

By configuring the bladder opening to be higher than the tray body, the bladder opening is exposed outside the tray body to facilitate an operation on the bladder opening.

In some embodiments, the pressing body comprises two stacked bladders.

By configuring the pressing body to comprise two stacked bladders, the thickness of the pressing body can be increased by stacking the bladders, so as to adapt to battery cells of different thicknesses and improve the compatibility of the tray with different battery cells.

In some embodiments, the pressing body further comprises a partition plate sandwiched between the two bladders.

By providing the partition plate between the two bladders, the thickness of the pressing body is further increased by means of the partition plate so as to adapt to battery cells with smaller thicknesses. Moreover, since the partition plate is sandwiched between the bladders, the thickness of the pressing body can also be adjusted by withdrawing or replacing the partition plate, thereby improving the compatibility of the tray with the battery cells in different thickness ranges.

In some embodiments, the pressing body is further provided with a first connecting portion connected to the tray body.

By connecting the first connecting portion to the tray body, the pressing body is connected to the tray body, preventing any movement of the pressing body on the tray body, so that the battery cell placed between two adjacent pressing bodies is kept stable, reducing the influence of deviation of a single battery cell S on the positions of other battery cells, and thus alleviating the problem of an electrode terminal of the battery cell being misaligned with a probe on a production apparatus during the production of the battery cell.

In some embodiments, the tray body is provided with a plurality of first positioning portions arranged at intervals, and the first connecting portions are connected to the first positioning portions in one-to-one correspondence.

By connecting the first connecting portions to the first positioning portions on the tray body in one-to-one correspondence, the first positioning portions are used to control the directions and positions of the pressing bodies on the tray body, thereby achieving accurate control over a distance between two adjacent pressing bodies, and thus achieving control over the pressing pressures to the battery cell placed between the two adjacent pressing bodies.

In some embodiments, the first connecting portion is detachably connected to the tray body.

The pressing body can be detachably connected to the tray body by detachably connecting the first connecting portion to the tray body, so that the compatibility of the tray with different battery cells can be improved by replacing the pressing body to adapt to different types of battery cells.

In some embodiments, the first connecting portion comprises first insert members, wherein the first insert members are arranged at two opposite ends of the pressing body in the second direction crossed with the first direction, and the first insert members are in insertion fit with the tray body.

By arranging the first insert members at the two opposite ends of the pressing body in the second direction, the pressing body is in insertion fit with the tray body, thereby facilitating the replacement of the pressing body.

In some embodiments, the first direction and the second direction are perpendicular to each other.

By setting the first direction and the second direction to be perpendicular to each other, the structure is simplified, and the operability is improved.

In some embodiments, the tray further comprises a plurality of carriers arranged between two adjacent pressing bodies, wherein the carrier is configured to carry the battery cell.

By providing the carriers, the compatibility of the tray with different battery cells can be improved. For example, when a battery cell has a larger size and may be directly loaded on the tray body, the battery cell may be directly placed between two adjacent pressing bodies; whereas when a battery cell has a smaller size, the battery cell may be carried by the carriers placed between the two adjacent pressing bodies. The carriers can limit the battery cell so as to prevent any movement of the battery cell. Moreover, the carriers lift and support the battery cell so that the battery cell can better correspond to the pressing bodies, facilitating restraint of the pressing bodies to the battery cell.

In some embodiments, the carrier comprises a bottom pad and a pair of side pads arranged upright at two ends of the bottom pad, wherein the side pads and the bottom pad form the U-shaped carrier.

The U-shaped carrier is formed with the bottom pad and the side pads, and the battery cell is loaded by the U-shaped carrier while the battery cell is limited.

In some embodiments, the bottom pad comprises a first bottom pad and a second bottom pad that are arranged parallel to each other and spaced from each other in a vertical direction, and a support rib connected between the first bottom pad and the second bottom pad, wherein the ends of the first bottom pad and the second bottom pad on one side are connected to one of the side pads, and the ends of the first bottom pad and the second bottom pad on the other side are connected to the other side pad.

By configuring the bottom pad to comprise the first bottom pad and the second bottom pad that are arranged in parallel and spaced from each other, the first bottom pad and the second bottom pad are connected to each other via the support rib, so that the bottom pad can meet the requirement for a supporting height of the battery cell, and the weight of the bottom pad is also controlled.

In some embodiments, the first bottom pad and/or the second bottom pad are provided with heat dissipation holes.

By providing the first bottom pad and/or the second bottom pad with the heat dissipation holes, the heat dissipation effect of the carrier is improved.

In some embodiments, the carrier is further provided with a second connecting portion configured to be connected to the tray body.

By connecting the second connecting portion to the tray body, the carrier is connected to the tray body, thereby preventing any movement of the carrier on the tray body.

In some embodiments, the tray body is provided with a plurality of second positioning portions arranged at intervals, and the second connecting portions are connected to the second positioning portions in one-to-one correspondence.

By connecting the second connecting portions to the second positioning portions on the tray body in one-to-one correspondence, the directions and positions of the carriers on the tray body are controlled by using the second positioning portions, thereby achieving indirect control over the position of the battery cell mounted on the carrier.

In some embodiments, the second connection is detachably connected to the tray body.

The carrier can be detachably connected to the tray body by detachably connecting the second connecting portion to the tray body, so that the compatibility of the tray with different battery cells can be improved by replacing the carrier to adapt to different types of battery cells.

In some embodiments, the second connecting portion comprises second insert members, wherein the second insert members are arranged at two opposite ends of the carrier in the second direction crossed with the second direction, and the second insert members are in insertion fit with the tray body.

By providing the second insert members at the two opposite ends of the carrier in the second direction, the carrier is in insertion fit with the tray body, thereby facilitating the replacement of the carrier.

In some embodiments, the tray body further comprises a bottom plate, a pair of end plates, and a pair of side plates, wherein the pair of side plates, the pair of end plates and the bottom plate form, in an enclosing manner, a receiving cavity for receiving the pressing bodies and the battery cell.

By providing the bottom plate, the end plates and the side plates, the receiving cavity for receiving the pressing bodies and the battery cell is formed in an enclosing manner, so that the structure is simple and is convenient to manufacture.

In some embodiments, the tray further comprises a box, wherein the box is provided with at least one mounting recess, and the tray body is located in the mounting recess.

By providing the box to load the tray body, the box can be used to protect the tray body, and in particular, during transportation, the friction between the tray body and other components can be decreased, and thus the battery cell loaded on the tray body is protected.

In some embodiments, the tray body is detachably arranged in the mounting recess.

By detachably mounting the tray body in the mounting recess, replacement of the tray body is facilitated to adapt to different battery cells.

In some embodiments, the box is a non-metallic member.

By providing the box as the non-metallic member, not only can the total weight of the tray be reduced, the pressure of transportation be reduced, but also the manufacturing cost of the tray can be reduced.

In some embodiments, a second weight-reducing hole is formed in the box.

By providing the second weight-reducing hole, the total weight of the tray can be reduced, and the pressure of transportation can be reduced.

In some embodiments, the tray body further comprises a baffle located in the receiving cavity and extending in the first direction, wherein the baffle divides the receiving cavity into at least two receiving sub-cavities configured to receive the pressing bodies and the battery cell.

By dividing the receiving cavity into the plurality of receiving sub-cavities with the baffle, and by receiving the pressing bodies and the battery cell with the receiving sub-cavities, the tray body has a simple structure and is easy to manufacture.

In some embodiments, the baffle is detachably arranged in the receiving cavity.

By detachably mounting the baffle in the receiving cavity, the replacement of the baffle is facilitated to adapt to different battery cells.

In some embodiments, the baffle is connected to the end plate in an inserted manner; and/or the baffle is threadedly connected to the side plate.

By arranging the baffle in the receiving cavity with an inserted or threaded connection, the operation is simple, and the reliability is also high.

In a second aspect, provided is a method for using a tray configured to carry a battery cell. The tray comprises: a tray body; and a plurality of bladders arranged at intervals in a first direction, wherein the bladders are arranged on the tray body, the battery cell is placed between two adjacent bladders, and the bladder is configured to be in contact with the battery cell so as to press the battery cell; and the bladder is provided with a bladder cavity capable of being filled with a fluid medium and a bladder opening in communication with the bladder cavity; The method for using a tray comprises: inserting a battery cell between two adjacent bladders; and filling the bladder cavity with a fluid medium through the bladder opening such that the bladder is in contact with the battery cell.

When the tray is in use, it is only necessary to load the battery cell and fill the bladder cavities with the fluid medium, so that the operation is simple, and the reliability is high.

In some embodiments, the method for using a tray further comprises: discharging the fluid medium filled in the bladder cavity through the bladder opening so as to release the pressing of the bladder on the battery cell; and taking out the battery cell from between the two adjacent bladders.

When the tray is in use, the battery cell can be taken out only by discharging the fluid medium from the bladder cavities, so that the operation is simple.

In a third aspect, provided is a battery production apparatus, comprising the tray provided in the first aspect of the embodiments of the present application.

By using the tray provided in the first aspect of the embodiments of the present application, the battery production apparatus provided in the third aspect of the embodiments of the present application can flexibly press the battery cell to reduce the dead space during pressing.

BRIEF DESCRIPTION OF THE DRAWINGS

In order to explain the technical solutions in the embodiments of the present application more clearly, the accompanying drawings to be used in the descriptions of the embodiments or exemplary technologies will be briefly introduced below. Obviously, the accompanying drawings described below are merely some embodiments of the present application, and a person of ordinary skill in the art would have obtained other drawings according to these drawings without involving any inventive effort.

Figure 1:
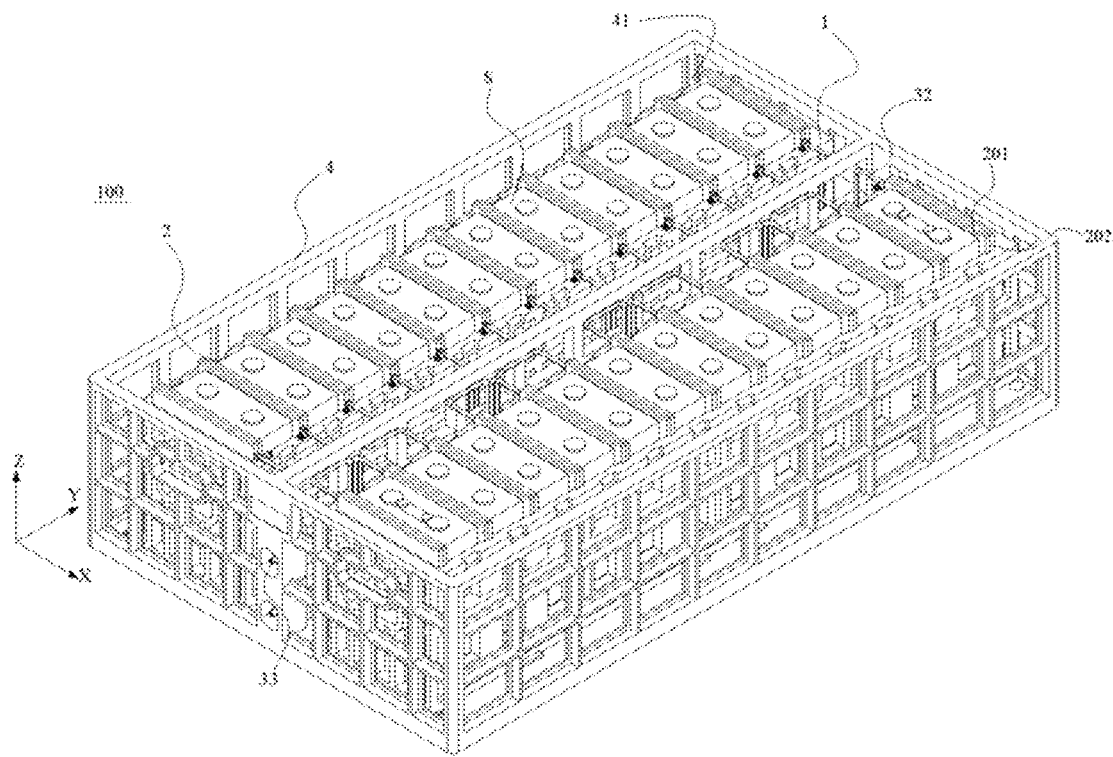
FIG. 1 is a schematic structural perspective view of a tray provided in an embodiment of the present application, showing a state where the tray is loaded with battery cells.

REFERENCE SIGNS IN DETAILED
DESCRIPTION OF EMBODIMENTS

S—Battery cell; Q—Fluid medium source;
100—Tray;
1—Tray body; 101—First weight-reducing hole; 102—First positioning portion; 103—Second positioning portion;
11—Bottom plate; 12—Side plate; 121—First insertion groove; 13—End plate; 131—First blind hole; 132—Second blind hole; 133—Sliding groove; 14—Receiving cavity; 141—Receiving sub-cavity; 15—Baffle; 151—Second insertion groove; 152—Third insertion groove; 1501—First sub-baffle; 1502—Second sub-baffle;
2—Pressing body; 201—Flexible pressing portion; 202—First connecting portion; 21—Bladder; 211—Frame; 2111—First sub-frame; 2112—Second sub-frame; 2113—Cover plate; 212—Frame opening; 213—Flexible skin; 214—First insert member; 2141—Fourth weight-reducing hole; 22—Bladder cavity; 23—Bladder opening; 24—Partition plate;
3—Fluid delivery assembly; 31—Main channel; 32—Sub-channel; 33—One-way valve;
4—Box; 41—Mounting recess; 42—Second weight-reducing hole;
5—Carrier; 501—Second connecting portion; 51—Bottom pad; 511—First bottom pad; 512—Second bottom pad; 513—Support rib; 514—Heat dissipation hole; 52—Side pad; 53—Second insert member; 531—Third weight-reducing hole.

DETAILED DESCRIPTION OF EMBODIMENTS

In order to make the objective, technical solutions, and advantages of the present application clearer, the present application is further described in detail below with reference to the accompanying drawings and the embodiments. It should be understood that the specific embodiments described herein are merely used to explain the present application and are not intended to limit the present application.

It should be noted that when a component is referred to as being "fixed to" or "arranged at" another component, the component may be directly located on the another component or indirectly located on the another component. When a component is referred to as being "connected to" another component, the component may be directly or indirectly connected to the another component. The orientations or positional relationships indicated by the terms such as "upper", "lower", "left", and "right" are based on the orientations or positional relationships shown in the drawings, and are only for convenience of description, rather than indicating or implying that the apparatus or element referred to must have a specific orientation or be constructed and operated in a specific orientation, and therefore cannot be construed as limiting the present application. For a person of ordinary skill in the art, the specific meanings of the foregoing terms can be understood based on specific situations. The terms "first" and "second" are used for convenience of description only, and cannot be construed as indicating or implying relative importance or implicitly indicating the number of technical features. The term "a plurality of" means two or more, unless otherwise explicitly and specifically defined.

In order to explain the technical solutions provided in the present application, a detailed description will be made below with reference to specific drawings and embodiments.

As a rechargeable traction battery, a lithium ion battery has the advantages of high energy, high battery voltage, wide operating temperature range, prolonged storage life, etc. The lithium ion batteries have been widely applied to electronic products and electric vehicles, and are increasingly popular in military and aerospace applications.

In a lithium ion battery production technology, a formation process, which is a very important step, is mainly a process of charging a battery cell for the first time so as to activate a lithium ion battery. During this process, a solvent and a lithium salt in an electrolyte solution undergo a side reaction, so that a layer of solid electrolyte interphase film is formed at a negative electrode of the lithium ion battery, while the solvent and some additives in the electrolyte solution are reduced or decomposed to cause severe gas generation inside the battery. If a gas generated during formation cannot be discharged in a timely manner, it may cause swelling of the battery and decrease of a group margin, and the electrolyte solution in the battery cannot completely infiltrate the negative electrode, and a small dry black spot with no lithium intercalated may be formed at the insufficiently infiltrated location, and lithium precipitation may also occur around the black spot; moreover, lithium ions deintercalated from the positive electrode may easily precipitate around bubbles, thereby affecting the electrical performance of the battery.

In order to mitigate the influence of the gas on the batteries, in the related art, during formation, the batteries are fixed in a restraining tray, the gas generated inside the batteries is pressed out of the batteries by means of mutual pressing of the batteries in the restraining tray. However, most of the batteries are externally covered by hard housings such as steel housings or aluminum housings, and when the batteries are pressed against each other, the hard housings bump against each other, resulting in the existence of a dead space during pressing, and thus causing poor exhaust of the batteries.

In view of this, in order to solve the above problem, the inventors have investigated in detail and designed a tray in which a battery cell is pressed by using pressing bodies having flexible pressing portions, and the flexible pressing portions can be deformed according to the shape of surfaces of the battery cell when pressing the battery cell, thereby decreasing the generation of dead space during pressing and improving an exhaust effect.

The tray disclosed in the embodiments of the present application may be applied to a battery production apparatus, such as a formation machine. The tray may also be applied to a battery test apparatus, such as a capacity tester.

Figure 2:
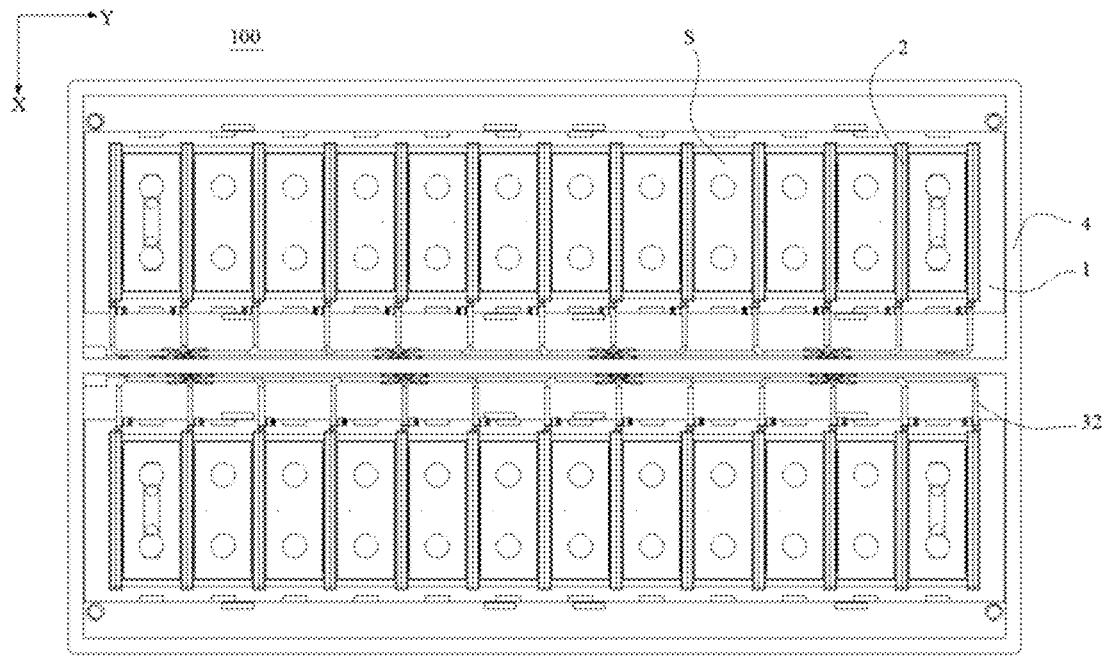
FIG. 2 is a schematic structural top view of a tray provided in an embodiment of the present application, showing a state where the tray is loaded with battery cells.
Figure 3:
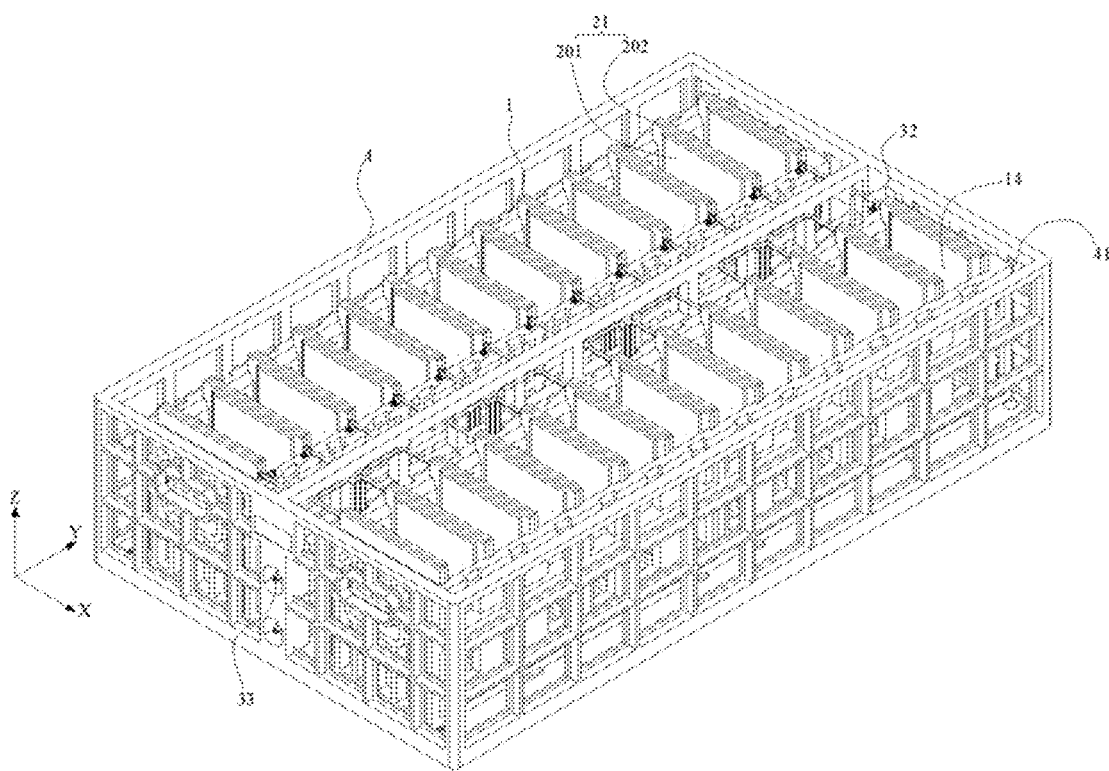
FIG. 3 is a schematic structural perspective view of a tray provided in an embodiment of the present application, showing a state where the tray is loaded with no battery cell.
Figure 13:
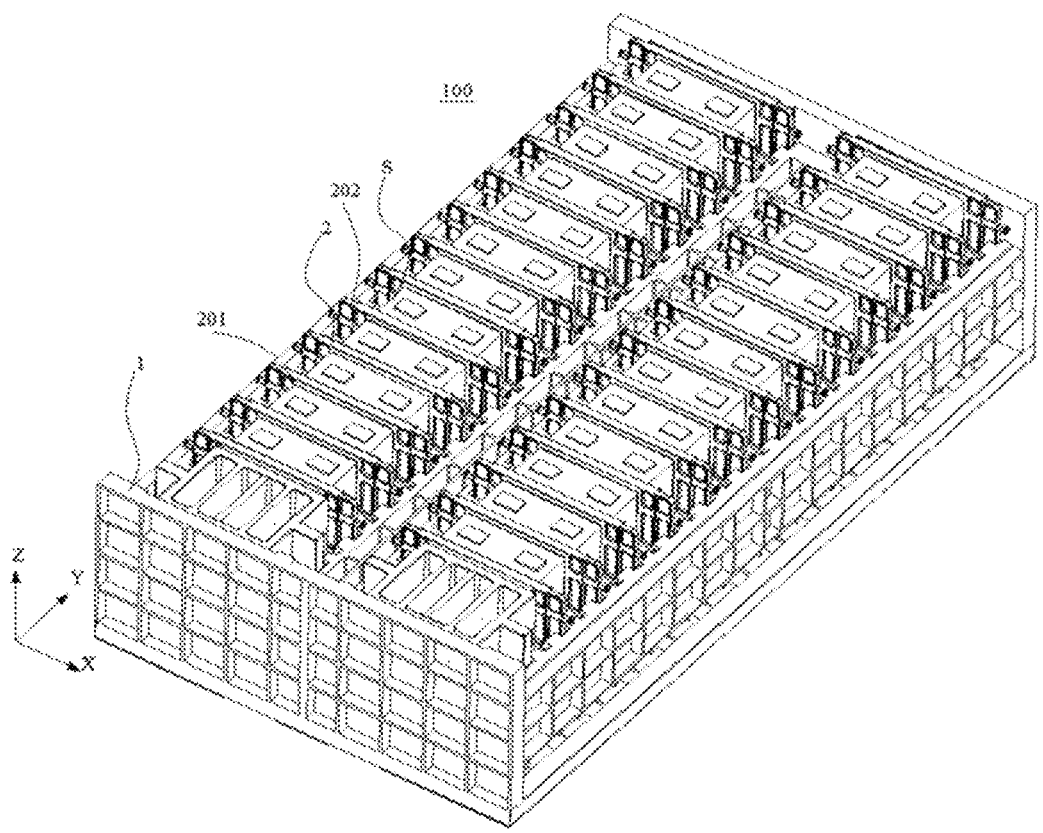
FIG. 13 is a schematic structural perspective view of a tray provided in another embodiment of the present application, showing a state where the tray is loaded with battery cells.
Figure 14:
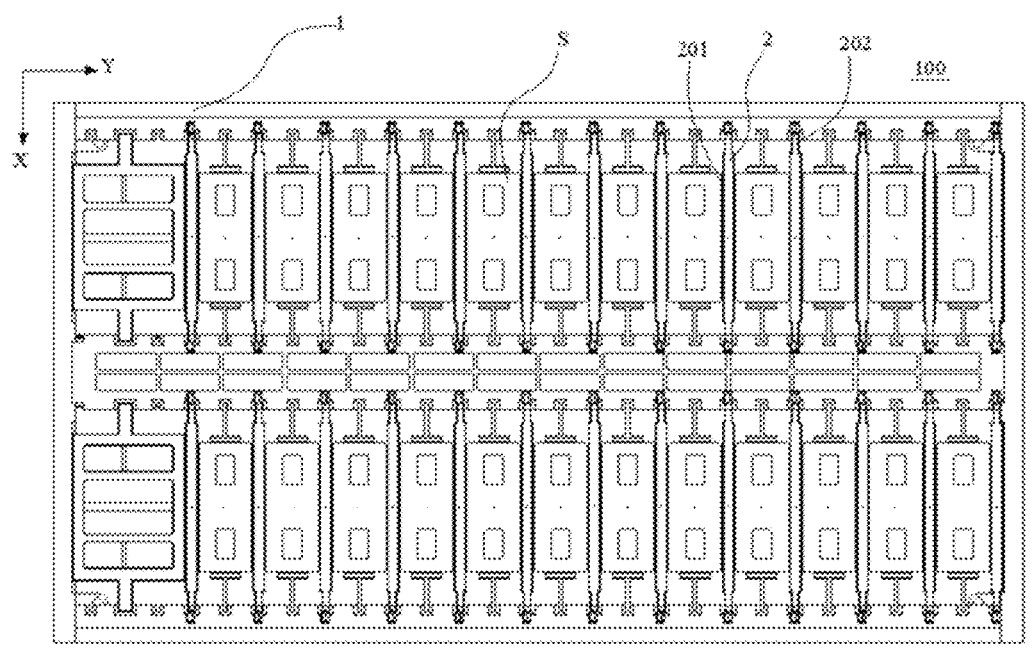
FIG. 14 is a schematic structural top view of a tray provided in another embodiment of the present application, showing a state where the tray is loaded with battery cells.
Figure 15:
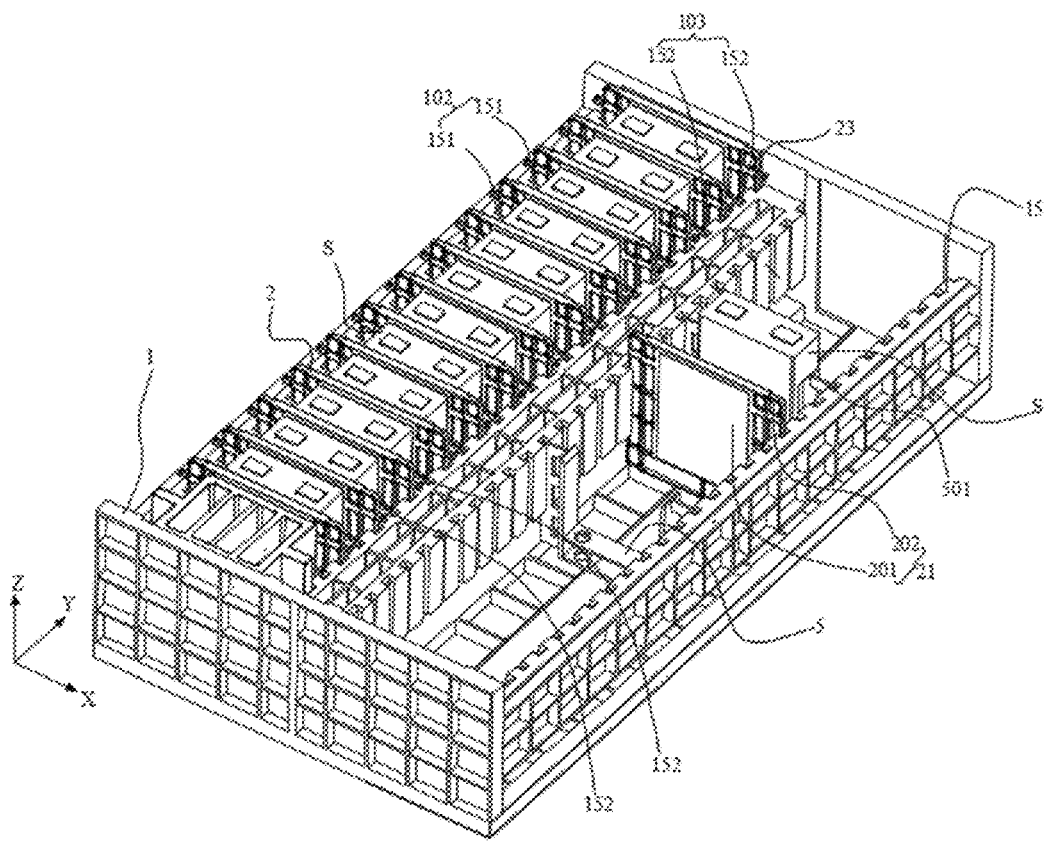
FIG. 15 is a schematic structural perspective view of a tray provided in another embodiment of the present application, showing a state where the tray is partially loaded with battery cells.
Figure 16:
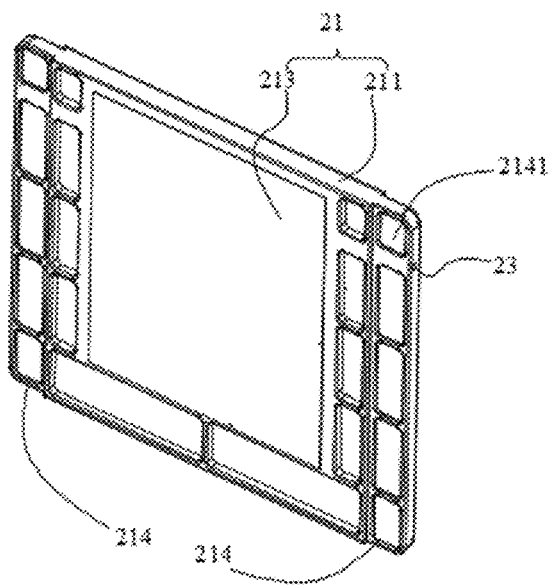
FIG. 16 is a schematic structural perspective view of a bladder in a tray provided in another embodiment of the present application.
Figure 17:
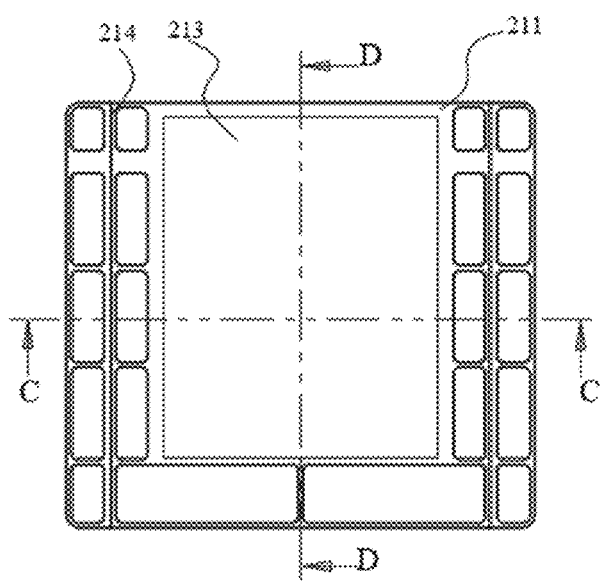
FIG. 17 is a schematic structural front view of a bladder in a tray provided in another embodiment of the present application.
Figure 18:
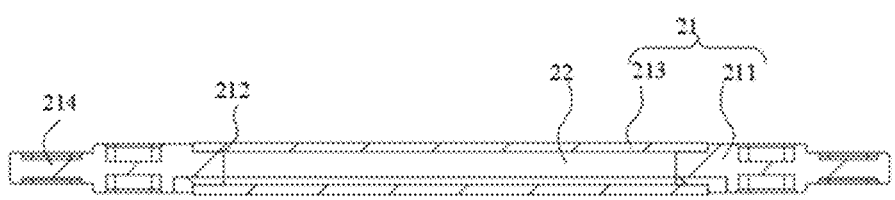
FIG. 18 is a sectional view taken along line C-C in FIG. 17.
Figure 19:
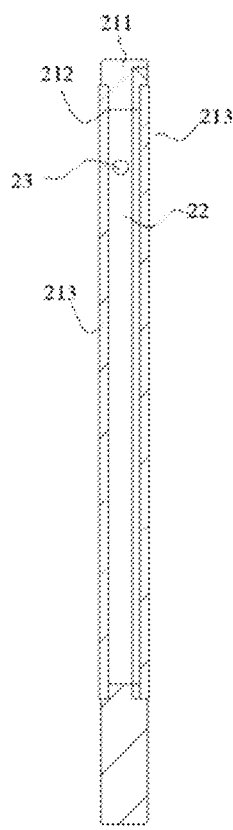
FIG. 19 is a sectional view taken along line D-D in FIG. 17.

According to some embodiments of the present application, reference is made to FIGS. 1 to 3 and FIGS. 13 to 15, wherein FIGS. 1 to 3 illustrate a tray 100 of an implementation, and FIGS. 13 to 15 illustrate a tray 100 of another implementation. The embodiments of the present application provide a tray 100. The tray 100 is configured to carry a battery cell S. The tray 100 comprises a tray body 1 and a plurality of pressing bodies 2. The tray 100 comprises a tray body 1 and a plurality of pressing bodies 2. The plurality of pressing bodies 2 are arranged at intervals in a first direction. The pressing bodies 2 are arranged on the tray body 1. The battery cell S is placed between two adjacent pressing bodies 2. The pressing body 2 is provided with a flexible pressing portion 201. The flexible pressing portion 201 is configured to be in contact with the battery cell S so as to press the battery cell S.

The battery cell S refers to a basic unit for implementing mutual conversion of chemical energy and electric energy, and comprises at least a positive electrode, a negative electrode, a separator, an electrolyte solution, a tab, and a housing. The battery cell S may include a lithium ion secondary battery cell, a lithium ion primary battery cell, a lithium-sulfur battery cell, a sodium-lithium ion battery cell, a sodium ion battery cell, a magnesium ion battery cell, etc., which will not be limited in the embodiments of the present application. The battery cell S may be in a cylindrical shape, a flat shape, a cuboid shape or another shape, which is also not limited in the embodiments of the present application. The battery cell S may be used in, but is not limited to, a power consuming device such as a vehicle, a ship or an aircraft.

The tray body 1 refers to a component for carrying the battery cell S. The tray body 1 may be a flat tray or a box-type tray as long as the tray can carry the battery cell S. The tray body 1 may be formed integrally or by means of assembling. The material of the tray body 1 may be, but is not limited to, metal, plastic, inorganic non-metal, or wood. Optionally, the tray body 1 is provided with a first weight-reducing hole 101. For example, the first weight-reducing hole 101 is a hollow-out hole formed in the tray body 1.

The pressing body 2 refers to a component for pressing the battery cell S. The flexible pressing portion 201 refers to a component that deforms when subjected to a force. The plurality of pressing bodies 2 refer to at least two pressing bodies 2. For example, there may be three pressing bodies 2 or ten pressing bodies 2. Optionally, the pressing body 2 comprises a flexible member made of a flexible material, such as a pressing block (not shown) made of silicone. The pressing block comprises a pressing body and an arc-shaped pressing bulge formed by outward protruding the pressing body. The arc-shaped pressing bulge is configured to be in contact with the battery cell S and press the battery cell S. Optionally, the pressing body 2 comprises a bladder including, but is not limited to, a gas bladder and a liquid bladder.

The first direction is an extension direction of a carrying surface for carrying a material on the tray body 1. It can be understood that the surface may extend in a curved or horizontal manner, the extension directions of the surface typically include a plurality of different directions, and when the pressing body 2 is arranged on the tray body 1, one of the extension directions may be selected to be the first direction. Optionally, in some implementations, the first direction is the Y direction in the figures. Of course, in some other implementations, the X direction in the figures may also be selected to be the first direction, which will not be limited herein.

The pressing body 2 is arranged on the tray body 1, that is, the pressing body 2 is located on the tray body 1. The pressing body 2 may be detachably mounted on the tray body 1, or may be integrally arranged on the tray body 1. The pressing body 2 may be directly connected to the tray body 1, or may be indirectly connected to the tray body 1 by being supported on the tray body 1 via other components, such as a support seat.

In the tray 100 provided in the embodiments of the present application, the tray body 1 is provided with a plurality of pressing bodies 2 arranged at intervals in the first direction, so that when the tray 100 is in use, the battery cell S is placed between two adjacent pressing bodies 2, and the flexible pressing portions 201 on the pressing bodies 2 are in contact with the battery cell S and flexibly press the battery cell S; and when flexibly pressing the battery cell S, the flexible pressing portions 201 deform according to the shape of surfaces of the battery cell S, decreasing the generation of dead space during pressing, improving the exhaust effect of the battery cell S, decreasing the generation of black spots on an electrode interface, and reducing the risk of lithium precipitation.

Figure 4:
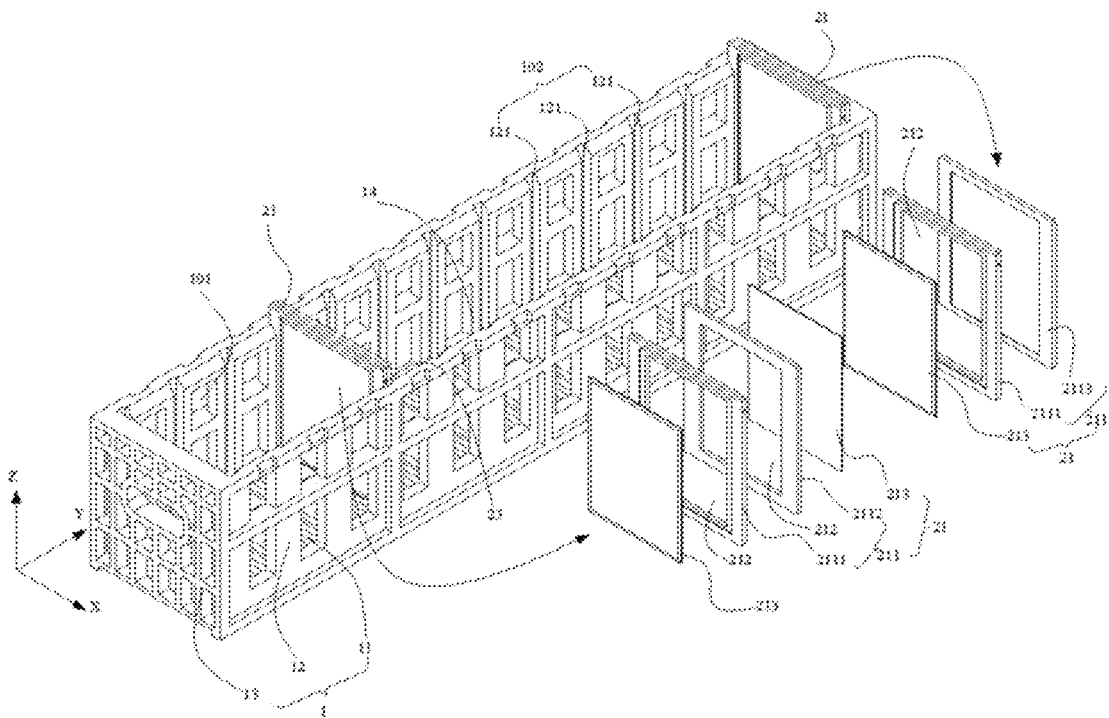
FIG. 4 is a schematic structural perspective view of a tray provided in an embodiment of the present application, showing the structure of a tray body in a perspective view and the structure of a bladder in an exploded view.
Figure 5:
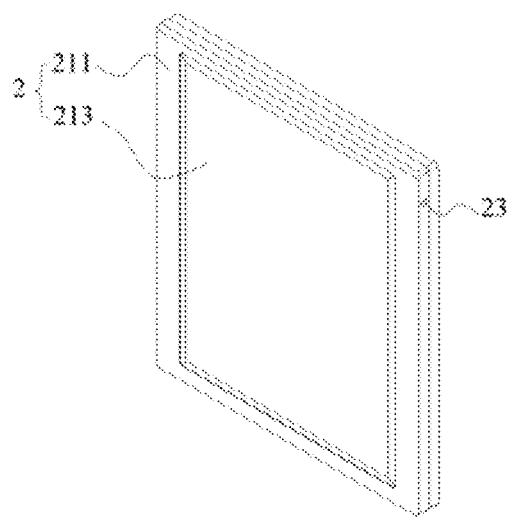
FIG. 5 is a schematic structural perspective view of a bladder in a tray provided in an embodiment of the present application.
Figure 6:
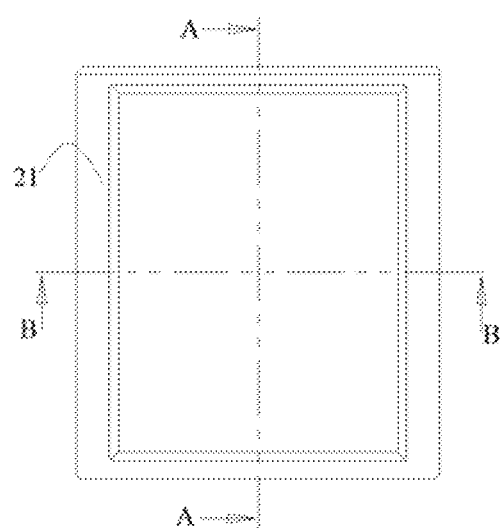
FIG. 6 is a schematic structural front view of a bladder in a tray provided in an embodiment of the present application.
Figure 7:
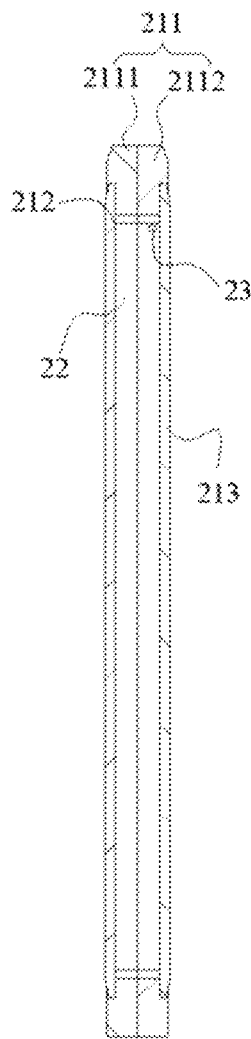
FIG. 7 is a sectional view taken along line A-A in FIG. 6.
Figure 8:
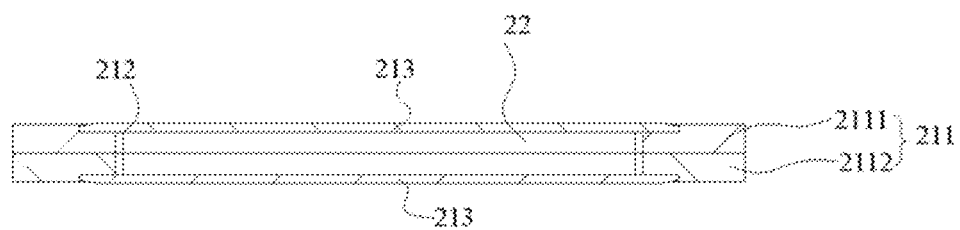
FIG. 8 is a sectional view taken along line B-B in FIG. 6.

According to some embodiments of the present application, with reference to FIGS. 3, 4 and 15, the pressing body 2 comprises at least one deformable bladder 21. At least part of the bladder 21 is formed as the flexible pressing portion 201.

The bladder 21 refers to a flexible container that can be filled with a medium and utilizes the pressibility and/or flowability of the medium to achieve elastic deformation. The bladder 21 herein may be deformed by adjusting the amount of the filled medium. For example, the bladder 21 may expand by means of inflation, and the bladder 21 may contract by means of deflation. It is also possible to achieve deformation by changing a state of the medium in the bladder 21. For example, by increasing a temperature, water in the bladder 21 is vaporized, so that the bladder 21 expands and becomes larger; and by decreasing the temperature, steam in the bladder 21 is condensed, so that the bladder 21 contracts and becomes smaller. It should be noted that the medium may be a medium in a gaseous state at normal temperature, such as air, an inert gas, nitrogen, etc., and in this case, the bladder 21 is a gas bladder. It may also be a medium that is liquid at normal temperature, such as water, oil, etc., and in this case, the bladder 21 is a liquid bladder. It may even be a medium that is solid at normal temperature, such as paraffin which melts into a liquid upon heating. The bladder 21 may be of a flexible structure as a whole or partially as long as the flexible pressing portion 201 configured to be in contact with the battery cell S is flexible. The bladder 21 may be integrally manufactured or obtained by assembling a plurality of components.

Optionally, the pressing body 2 comprises one bladder 21, and the battery cells S located on two sides of the bladder 21 are each pressed by the bladder 21.

Optionally, the pressing body 2 comprises a plurality of bladders 21, such as two bladders 21 stacked together in a back-to-back manner, and the two bladders 21 each press the battery cells S on the two sides thereof. The term "a plurality of" herein refers to two or more (including two).

In the embodiments of the present application, by providing the bladders 21 to press the battery cell S, and when the battery cell S is being charged or discharged, the battery cell S expands or contracts, and at the same time, the bladders 21 can be elastically deformed self-adaptively according to the shape of the battery cell S, so that the flexible pressing portions 201 on the bladders 21 always keep pressing on the surfaces of the battery cell S, improving the group margin of the compressed battery cell S, and alleviating the crumpling phenomenon of a tab in the battery cell S due to the volume changes of the battery cell S.

According to some embodiments of the present application, with reference to FIGS. 4 to 8 and FIGS. 15 to 19, a bladder cavity 22 capable of being filled with a fluid medium is formed in the bladder 21. The bladder 21 is further provided with a bladder opening 23, and the bladder opening 23 is in communication with the bladder cavity 22.

The fluid medium refers to a medium that is fluid at normal temperature, such as a gaseous medium or a liquid medium. The bladder cavity 22 refers to a cavity that can contain a medium. The bladder opening 23 refers to a channel through which a medium can pass, including but not limited to a through hole.

When the tray 100 is in use, a battery cell S is first inserted between two adjacent bladders 21 when a small amount of the fluid medium is filled in the bladder cavities 22, and the bladder cavities 22 are then filled with the fluid medium through the bladder openings 23, so that the volumes of the bladders 21 expand and become larger, and the battery cell S is pressed. After formation or testing is completed, the fluid medium in the bladder cavities 22 may be discharged through the bladder openings 23, the volumes of the bladders 21 contract and become smaller, and the battery cell S between the two adjacent bladders 21 is taken out after the pressing on the battery cell S by the bladders 21 is released.

By providing the bladder 21 with the bladder cavity 22 and the bladder opening 23, the volume of the bladder 21 can be varied by using the bladder opening 23 to adjust the amount of the fluid medium filled in the bladder cavity 22. In this way, when the tray 100 is in use, it is possible to fill the bladder cavities 22 with the fluid medium through the bladder openings 23 only when the battery cell S needs to be pressed, to maintain the bladder cavities 22 empty or to fill a small amount of fluid medium when the battery cell S is loaded or unloaded, thereby facilitating removal and placement of the battery cell S. In addition, it is also possible to adjust the amount of the fluid medium filled in the bladder cavities 22 through the bladder openings 23, so as to adjust pressing forces of the bladders 21 on the battery cell S, and preventing the phenomenon that the battery cell S is subjected to an excessively large force to cause poor appearance, such as depression of a shell, of the battery cell S, or is subjected to an excessively small force to cause lithium precipitation.

The battery cells S vary in thickness, hardness, shape, group margin, etc. due to fabrication errors and the like in the manufacturing process. Due to these differences, a tray in the related art not only has poor compatibility when pressing the battery cells S, but also has a problem that the battery cells S are not uniformly stressed during pressing.

In the tray 100 provided in the embodiments of the present application, since the bladders 21 can be self-adaptively deformed according to the shape of the surfaces of the battery cell S, and the amount of the fluid medium filled in the bladder cavities 22 can also be adjusted by means of the bladder openings 23, the compatibility of the tray 100 for the thickness, shape, group margin, etc. of the battery cell S is improved, and the uniformity of the forces applied to each battery cell S is improved.

According to some embodiments of the present application, with reference to FIGS. 4-8 and FIGS. 15-19, the bladder 21 comprises a frame 211 and a flexible skin 213. The frame 211 is rigid, the flexible skin 213 covers a frame opening 212 on at least one side of the frame 211, the frame 211 and the flexible skin 213 form the bladder cavity 22 in an enclosing manner, and the flexible skin 213 is formed as the flexible pressing portion 201.

The frame 211 refers to a component having a border structure. It can be understood that with the border structure, the frame 211 is provided with a cavity surrounded by the border structure, and an opening in communication with the cavity, that is, the frame opening 212 is formed on at least one side of the border structure. That is to say, the frame opening 212 is formed on at least one side of the frame 211. The material of the frame 211 may be, but is not limited to, metal, plastic, inorganic non-metal or wood.

Optionally, frame openings 212 are formed on two sides of the frame 211. For example, the frame 211 comprises a first sub-frame 2111 and a second sub-frame 2112 that are each provided with a through hole, and the first sub-frame 2111 and the second sub-frame 2112 are superposed together to jointly form the frame 211. When the frame openings 212 are formed on the two sides of the frame 211, the bladder 21 comprises two flexible skins 213, the two flexible skins 213 respectively cover the frame openings 212 on the two sides of the frame 211. For example, one of the flexible skins 213 covers the opening of the first sub-frame 2111 on the side away from the second sub-frame 2112, and the other flexible skin 213 covers the opening of the second sub-frame 2112 on the side away from the first sub-frame 2111. In this case, the bladder 21 may be arranged in the middle of the tray body 1, and the two sides of the bladder 21 may press the battery cell S. For convenience of subsequent reference, such a bladder 21 with two sides capable of pressing the battery cell S is referred to as a double-sided bladder. Of course, in another implementation, the frame 211 may be integrally formed, for example, by hollowing out a plate.

Optionally, the frame opening 212 is formed on only one side of the frame 211. For example, the frame 211 comprises a first sub-frame 2111 each provided with a through hole, and a cover plate 2113, the first sub-frame 2111 and the second sub-frame 2112 are superposed together to jointly form the frame 211, the cover plate 2113 covers an opening on one side of the first sub-frame 2111, and an opening on the other side of the first sub-frame 2111 forms the frame opening 212. When the frame opening 212 is formed on only one side of the frame 211, the bladder 21 comprises one flexible skin 213, the cover plate 213 covers the frame opening 212 on one side of the frame 211. For example, the flexible skin 213 covers the opening of the first sub-frame 2111 on the side away from the cover plate 2113. In this case, the bladder 21 may be arranged at an end portion of the tray body 1, and the battery cell S is pressed by using the side of the bladder 21 on which the flexible skin 213 is arranged. For convenience of subsequent reference, such a bladder 21 with only one side capable of pressing the battery cell S is referred to as a single-sided bladder. Of course, in another implementation, the frame 211 may also be integrally formed, for example, by inwardly recessing a plate.

The flexible skin 213 refers to a deformable component through which a medium is difficult to pass. The material of the flexible skin 213 may be, but is not limited to, silicone, cow leather, rubber or latex. The way of connecting the flexible skin 213 to the frame 211 may be, but is not limited to, bonding, welding, or clamping. For example, the flexible skin 213 is a silicone member, and the flexible skin 213 may be fixed to the frame 211 by means of a silicone vulcanization technique.

By configuring the bladder 21 to comprise the rigid frame 211 and the flexible skin 213 and by using the rigid frame 211 as a framework, the flexible skin 213 is supported and shaped, so that the flexible skin 213 is kept open and stretched and is capable of being better in contact with and pressing the battery cell S, decreasing the dead space during pressing. In addition, the rigid frame 211 may also assist in mounting, or even the frame 211 itself may be mounted as a connecting portion with the tray body 1, so as to improve the mounting convenience of the bladder 21.

According to some embodiments of the present application, with reference to FIGS. 5 to 8 and FIGS. 15 to 19, the bladder opening 23 is formed in the frame 211, and the bladder opening 23 makes the bladder cavity 22 open.

The bladder opening 23 making the bladder cavity 22 open means that the bladder opening 23 is configured to communicate the bladder cavity 22 with the outside. Optionally, a single bladder 21 is provided with one bladder opening 23. By providing one bladder opening 23, it is possible to make the structure of the bladder 21 simple as much as possible and to improve the reliability of the bladder 21 while ensuring the circulation of the medium. Optionally, a plurality of bladder openings 23 are formed in a single bladder 21, and the plurality of bladder openings 23 are distributed on the frame 211 at intervals. For example, there are two bladder openings 23, and the two bladder openings 23 are respectively formed at two opposite ends of the frame 211. The fluid medium may be rapidly filled in or discharged out of the bladder cavity 22 through the plurality of bladder openings 23 distributed at intervals, achieving rapid expansion and contraction of the volume of the bladder 21.

By forming the bladder opening 23 in the rigid frame 211, the frame 211 is not in direct contact with the battery cell S during pressing, so that it is possible to prevent the battery cell S from blocking the bladder opening 23 when the tray 100 is in use, and the rigid frame 211 is also used to shape the bladder opening 23, thereby facilitating docking with other components by means of the bladder opening 23, such as connection to an assembly for delivering a fluid medium, and promoting filling or discharging of the fluid medium.

According to some embodiments of the present application, with reference to FIGS. 6-11 and FIG. 20, the tray 100 further comprises a fluid delivery assembly 3. The fluid delivery assembly 3 is in communication with the bladder cavity 22, and the fluid delivery assembly 3 is arranged in the first direction.

The fluid delivery assembly 3 refers to a component for delivering the fluid medium. The fluid medium may flow into the bladder cavity 22 or out of the bladder cavity 22 by means of the fluid delivery assembly 3. Specifically, one end of the fluid delivery assembly 3 is connected to the bladder opening 23 so as to implement communication with the bladder cavity 22. The fluid delivery assembly 3 includes, but is not limited to, a gas or liquid pipe.

Figure 10:
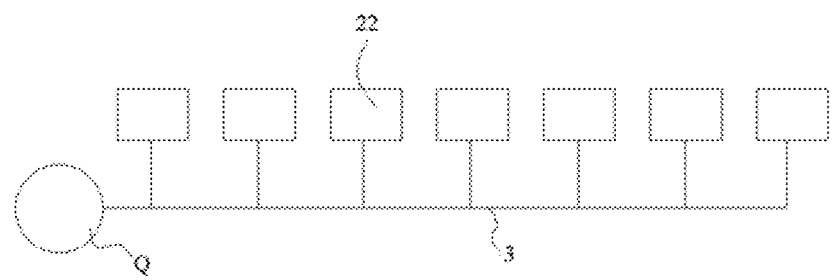
FIG. 10 is a schematic structural diagram of a first implementation of a fluid delivery assembly in a tray provided in an embodiment of the present application.
Figure 11:
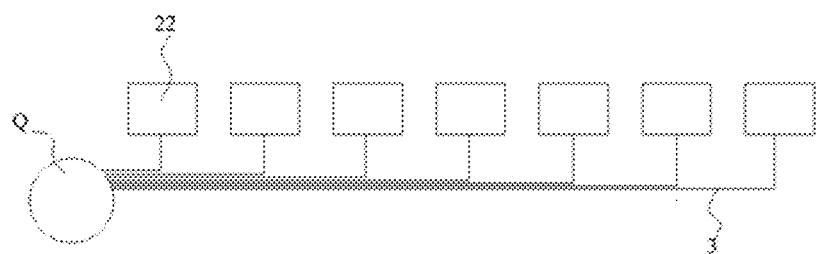
FIG. 11 is a schematic structural diagram of a second implementation of a fluid delivery assembly in a tray provided in an embodiment of the present application.

The fluid delivery assembly 3 is arranged in the first direction, that is, the fluid delivery assembly 3 is arranged in the direction in which the plurality of pressing bodies 2 are arranged at intervals. Optionally, when the plurality of pressing bodies 2 are arranged at intervals in the Y direction, the fluid delivery assembly 3 is arranged in the Y direction. Of course, in other implementations, if the plurality of pressing bodies 2 are arranged at intervals in the X direction, the fluid delivery assembly 3 is arranged in the X direction. It should be noted herein that the fluid delivery assembly 3 may be in the form of a main pipeline and branch pipelines. Referring to FIG. 10, the main pipeline is in communication with each branch pipeline; moreover, the main pipeline is configured to be in communication with a fluid medium source Q, such as a gas source, and the branch pipelines are each in communication with a respective bladder cavity 22. The fluid delivery assembly 3 may also be in the form of parallel branch pipelines. Referring to FIG. 11, the branch pipelines are each configured to be in communication with the fluid medium source Q and the bladder cavity 22.

Since the plurality of pressing bodies 2 are arranged at intervals in the first direction, the fluid delivery assembly 3 is correspondingly arranged in the first direction, and the fluid delivery assembly 3 is in communication with the bladder cavities 22, so that the fluid medium flows into or out of each bladder cavity 22 by means of the fluid delivery assembly 3.

Figure 9:
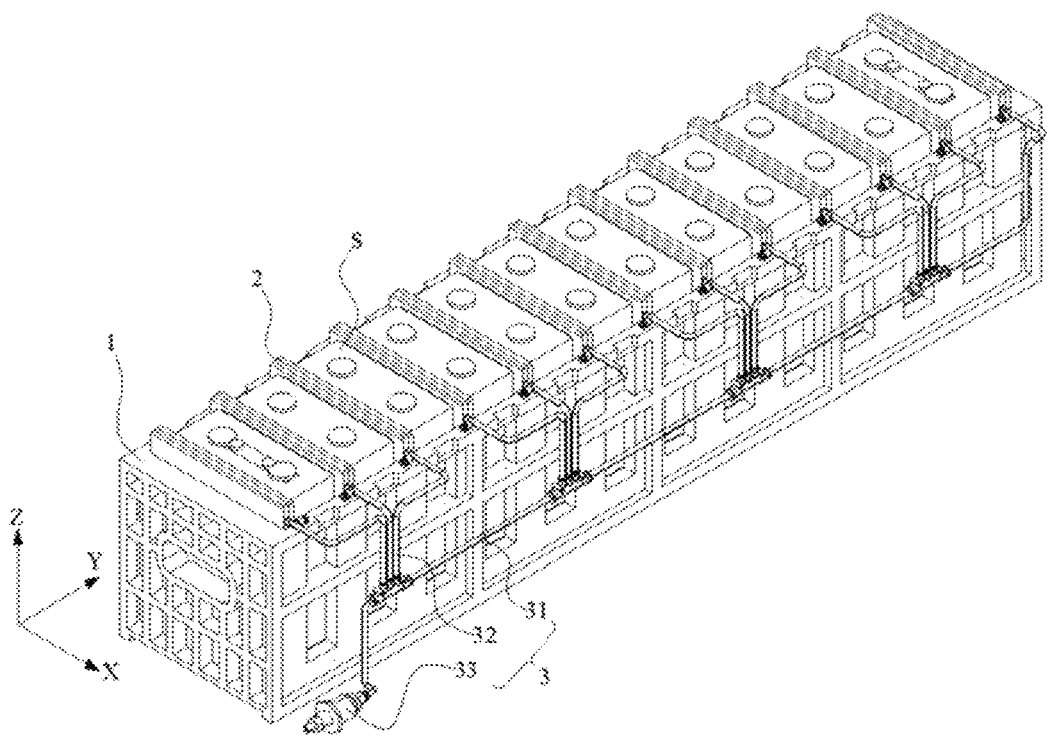
FIG. 9 is a schematic structural perspective view of a tray provided in an embodiment of the present application, showing a connection relationship between a bladder and a fluid delivery assembly.
Figure 20:
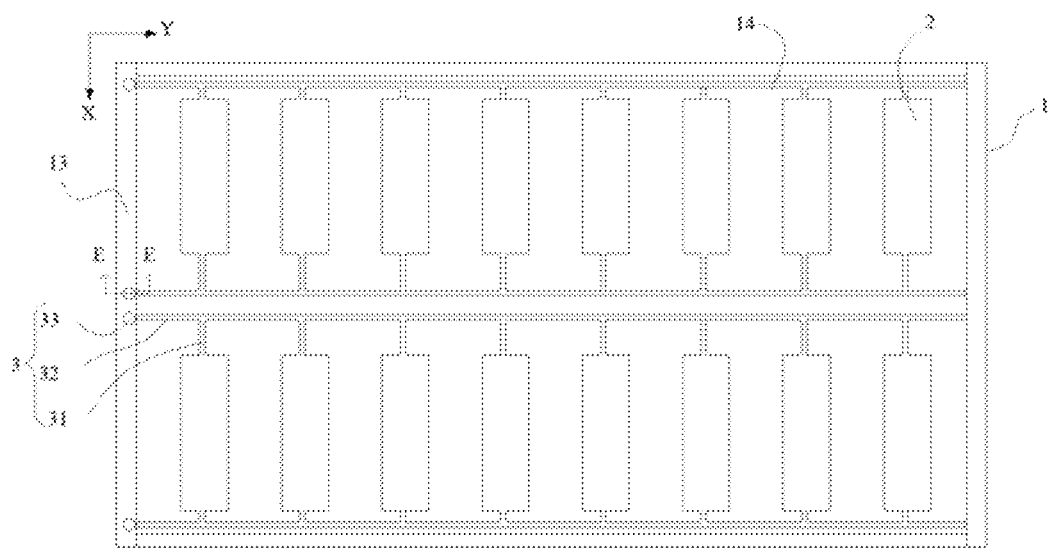
FIG. 20 is a schematic structural diagram of a fluid delivery assembly in a tray provided in another embodiment of the present application.

According to some embodiments of the present application, with reference to FIGS. 9 and 10 and FIG. 20, the fluid delivery assembly 3 comprises a main channel 31 and a plurality of sub-channels 32. The plurality of sub-channels 32 are each in communication with the main channel 31, and the sub-channels 32 are in communication with the bladder cavities 22 in one-to-one correspondence.

It can be understood that the number of sub-channels 32 corresponds to the number of bladder cavities 22, for example, if the number of bladder cavities 22 is 5, the number of sub-channels 32 is also 5.

The main channel 31 may be configured to be in communication with the fluid medium source Q, such as a gas source. When the bladder cavities 22 are filled with the fluid medium, the fluid medium first enters the plurality of sub-channels 32 through the main channel 31 and then enters the plurality of bladder cavities 22 through the plurality of sub-channels 32 respectively. Optionally, one end of the main channel 31 is connected to the fluid medium source Q. Of course, in another implementation, it is also possible that two ends of the main channel 31 are respectively with the fluid medium source Q.

Optionally, the main channel 31 extends in the first direction.

Optionally, the main channel 31 is a straight-through pipe, the sub-channel 32 is an elbow pipe, and the fluid delivery assembly 3 further comprises an adapter, such as a three-way pipe, and the straight-through pipe and the elbow pipe are both connected to the adapter.

By providing the main channel 31 and the plurality of sub-channels 32 in communication with the main channel 31 and by further configuring the plurality of sub-channels 32 to communicate with the plurality of bladder cavities 22 in one-to-one correspondence, one main channel 31 can be in communication with all the plurality of bladder cavities 22, and the bladder cavities 22 can be in communication with each other by means of the main channel 31 and the sub-channels 32. By using the principle of communicating vessels, the pressing forces of the bladders 21 on the battery cell S can be balanced, and the uniformity of the forces applied to each battery cell S can be improved. For example, when the pressing force of one bladder 21 on the battery cell S is excessively large, the fluid medium in the bladder cavity 22 of the bladder 21 flows out through the corresponding sub-channel 32 and flows into the bladder cavities 22 of other bladders 21 through the main channel 31 until the pressures in the bladder cavities 22 are substantially the same, thereby balancing the pressing forces of the bladders 21 on the battery cell S.

According to some embodiments of the present application, with reference to FIG. 9, at least one end of the main channel 31 is provided with a one-way valve 33.

The one-way valve 33 refers to a component that can allow one-way flow of a fluid medium and cannot allow backflow. Optionally, one end of the main channel 31 is provided with a one-way valve 33, and the main channel 31 is connected to the fluid medium source Q via the one-way valve 33. Of course, in other embodiments, one-way valves 33 may be provided at two ends of the main channel 31. Optionally, the one-way valve 33 is a valve core needle.

By providing the one-way valve 33 on the main channel 31, the fluid medium can only flow into the main channel 31 through the one-way valve 33, but the fluid medium in the main channel 31 cannot flow out through the one-way valve 33, so that even if the fluid medium is separated from the fluid medium source Q after the bladder cavities 22 are filled with the fluid medium, the bladders 22 can still continuously press the battery cell S, thereby facilitating the transfer of the tray 100 at different stations. In addition, due to the arrangement of the one-way valve 33, the fluid medium flowing into the main channel 31 does not flow back, and the total amount of the fluid medium filled in the bladder cavities 22 can be generally determined only if the amount of the fluid medium flowing into the main channel 31 is determined, so that the pressing force of each bladder 21 on the battery cell S can be well controlled.

According to some embodiments of the present application, with reference to FIGS. 9 and 20, the fluid delivery assembly 3 is located on one side of the bladder 21 in a second direction crossed with the first direction.

The second direction being crossed with the first direction means that the second direction intersects with the first direction, that is, the second direction is not in the same or opposite relationship with the first direction. Optionally, the second direction and the first direction are in a perpendicular relationship. Optionally, the second direction is the X direction, and the fluid delivery assembly 3 is located on one side of the bladder 21 in the X direction, so that when the tray 100 is in use, the battery cell S can be directly withdrawn in the Z direction, preventing the fluid delivery assembly 3 from interfering with the withdrawal of the battery cell S.

Optionally, with reference to FIG. 9, the tray body 1 is provided with a receiving cavity 14, the plurality of bladders 21 are located in the receiving cavity 14, and the fluid delivery assembly 3 is located outside the receiving cavity 14. Of course, in other implementations, the fluid delivery assembly 3 may also be located in the receiving cavity 14.

By arranging the fluid delivery assembly 3 on one side of the bladder 21 in the second direction, that is, by arranging the fluid delivery assembly 3 and the bladder 21 side-by-side in the second direction, it can be understood that the fluid delivery assembly 3 is also arranged side-by-side with a carrying area located between two adjacent bladders 21 and available for the loading of the battery cell S, thereby preventing the carrying area from being occupied, which otherwise interferes with the placement of the battery cell S.

According to some embodiments of the present application, with reference to FIGS. 1, 3, and 9, the tray 100 further comprises a box 4. The tray body 1 is located in the box 4, and the fluid delivery assembly 3 is located outside the tray body 1 and fixed to the box 4.

The box 4 refers to a container having a loading function. The material of the box 4 includes, but is not limited to, metal, plastic, etc.

Optionally, the box 4 is provided with at least one mounting recess 41, and the tray body 1 is located in the mounting recess 41. The tray body 1 is provided with the receiving cavity 14, the bladder 21 is located in the receiving cavity 14, and the fluid delivery assembly 3 is located outside the receiving cavity 14 and fixed to the box 4.

The mounting recess 41 and the receiving cavity 14 refer to spaces available for loading and receiving. The mounting recess 41 is configured to load and receive the tray body 1, and the receiving cavity 14 is configured to load and receive the bladder 21 and the battery cell S. Optionally, the tray body 1 comprises a bottom plate 11, side plates 12, and end plates 13. The bottom plate 11, the side plates 12, and the end plates 13 form the receiving cavity 14 in an enclosing manner.

The fluid delivery assembly 3 is fixed to the box 4. Optionally, the fluid delivery assembly 3 is mounted on a side wall of the mounting recess 41.

By fixing the fluid delivery assembly 3 to the box 4 and locating the fluid delivery assembly outside the tray body 1, that is, by locating the bladder 21 and the fluid delivery assembly 3 respectively on inner and outer sides of the tray body 1, the fluid delivery assembly 3 is prevented from interfering with the loading of the bladder 21 and the battery cell S.

According to some embodiments of the present application, with reference to FIGS. 13, 20, 21 and 25, the tray body 1 is provided with the receiving cavity 14, a receiving sub-cavity 141 is further formed in the receiving cavity 14, the bladder 21 is located in the receiving sub-cavity 141, and the fluid delivery assembly 3 is fixed in the receiving cavity 14 but located outside the receiving sub-cavity 141.

The receiving cavity 14 refers to a space available for loading and receiving. Optionally, the tray body 1 comprises a bottom plate 11, side plates 12, and end plates 13. The bottom plate 11, the side plates 12, and the end plates 13 form the receiving cavity 14 in an enclosing manner. Optionally, the tray body 1 further comprises a baffle 15 for dividing the receiving cavity 14 into a plurality of receiving sub-cavities 141, for example, two receiving sub-cavities 141.

By providing the tray body 1 with the receiving cavity 14, and by further providing the receiving cavity 14 with the receiving sub-cavity 141, the bladder 21 is located in the receiving sub-cavity 141, whereas the fluid delivery assembly 3 is located outside the receiving sub-cavity 141, so that the bladder 21 and the fluid delivery assembly 3 are respectively located on inner and outer sides of the receiving sub-cavity 141, preventing the fluid delivery assembly 3 from interfering with the loading of the bladder 21 and the battery cell S.

Figure 21:
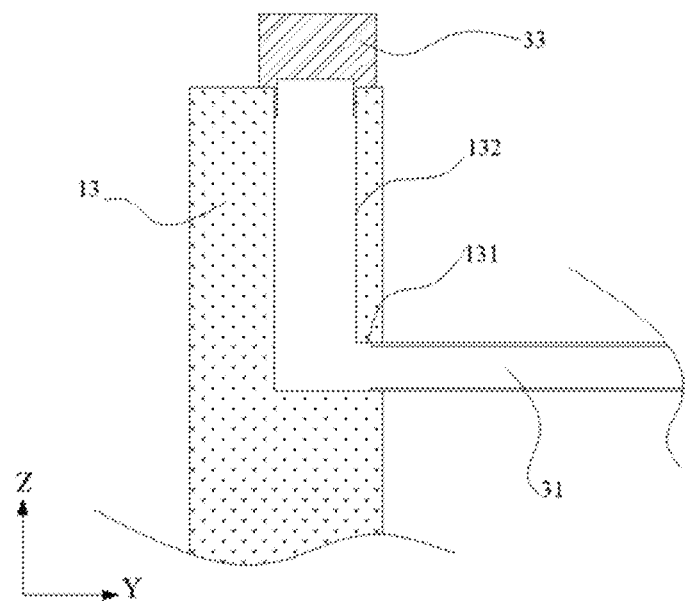
FIG. 21 is a sectional view taken along line E-E in FIG. 20.

According to some embodiments of the present application, with reference to FIGS. 20 and 21, the tray body 1 comprises an end plate 13. The end plate 13 extends in the second direction and is located at an end portion of the fluid delivery assembly 3 in the first direction, at least one end of the fluid delivery assembly 3 is arranged on the end plate 13, and the second direction is crossed with the first direction.

The second direction being crossed with the first direction means that the second direction is not in the same or opposite relationship with the first direction. Optionally, the second direction and the first direction are in a perpendicular relationship. Optionally, the second direction is the X direction.

Optionally, the fluid delivery assembly 3 comprises a main channel 31 and a plurality of sub-channels 32 in communication with the main channel 31. A least one end of the main channel 31 is provided with a one-way valve 33, and the one-way valve 33 is mounted on the end plate 13. The one-way valve 33 is fixed by mounting the one-way valve 33 on the end plate 13.

Optionally, the end plate 13 is provided with a first blind hole 131 and a second blind hole 132 that are in communication with each other. The first blind hole 131 extends in the first direction, the first blind hole 131 is in communication with the main channel 31, the second blind hole 132 extends in a third direction, the second blind hole 132 is connected to the one-way valve 33, and the third direction is crossed with the first direction and the second direction.

The third direction being crossed with the first direction and the second direction means that the third direction is not in the same or opposite relationship with the first direction and the second direction. Optionally, the third direction is perpendicular to the first direction and the second direction. Optionally, the first direction is the Y direction, the second direction is the X direction, and the third direction is the Z direction.

According to some embodiments of the present application, with reference to FIGS. 4 and 15, the tray body 1 avoids the bladder opening 23.

Avoidance refers to giving way. The tray body 1 avoiding the bladder opening 23 means that the tray body 1 gives way to the bladder opening 23 so as not to cover the bladder opening 23. Optionally, a hollow-out hole (not shown) or a slot corresponding to the bladder opening 23 is formed in the tray body 1 at the position corresponding to the bladder opening 23. Optionally, the tray body 1 is kept lower than the bladder opening 23 in height. For example, the side plate 12 or the baffle 15 is lower than the bladder opening 23 in height.

By configuring the tray body 1 to avoid the bladder opening 23, the bladder opening 23 is in an exposed state, and operations of delivering and transferring the fluid medium through the bladder opening 23 are thus facilitated.

Figure 25:
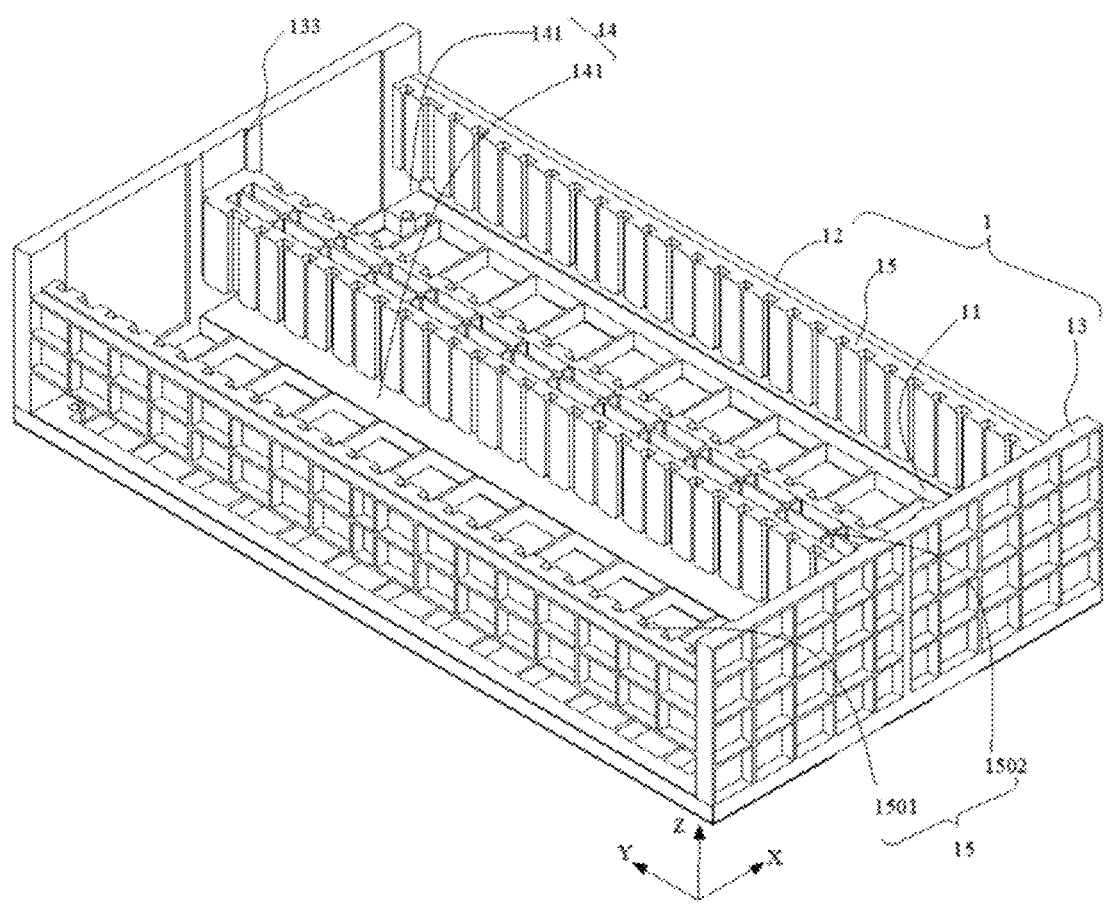
FIG. 25 is a schematic structural perspective view of a tray body in a tray provided in another embodiment of the present application.

According to some embodiments of the present application, with reference to FIGS. 4, 15 and 25, the bladder opening 23 is higher than the tray body 1.

By higher than means that among two which are compared based on the same reference plane, the one with the higher height is called higher than the other. The bladder opening 23 being higher than the tray body 1 herein consists in either that the bladder opening 23 is higher than a local area on the tray body 1 that corresponds to the bladder opening 23, or that the bladder opening 23 is higher than the entire tray body 1.

Optionally, the bladder opening 23 is formed in at least one end of the bladder 2. The tray body 1 further comprises side plates 12. The side plates 12 extend in the first direction and are distributed at opposite ends of the bladder 2. The bladder opening 23 is higher than the side plate 12.

The bladder opening 23 being higher than the side plate 12 means that the side plate 12 corresponding to the bladder opening 23 is lower than the bladder opening 23 in height. For example, only one end of the bladder 21 is provided with a bladder opening 23, and a pair of side plates 12 are provided at two ends of the bladder 21 respectively. The side plates are respectively defined as a first side plate and a second side plate for ease of differentiation. The first side plate corresponds to the bladder opening 23, and is set to be lower than the bladder opening 23 in height, and the second side plate may be higher than, lower than or even equal to the bladder opening 23 in height.

By configuring the bladder opening 23 to be elevated from the tray body 1, the bladder opening 23 is exposed outside the tray body 1 to facilitate an operation on the bladder opening 23.

Figure 26:
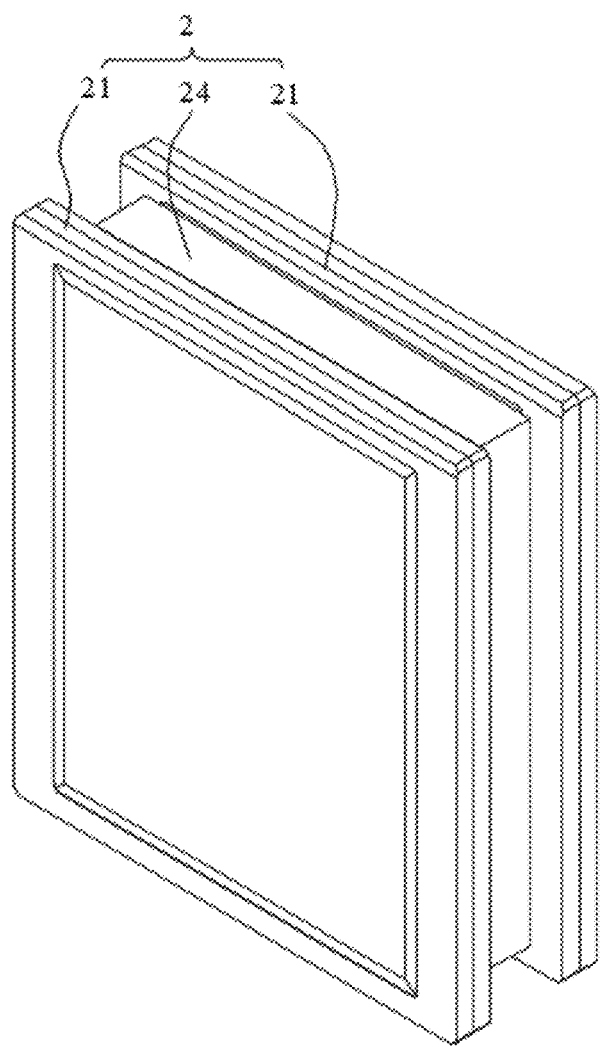
FIG. 26 is a schematic structural perspective view of a pressing body in a tray provided in another embodiment of the present application.

According to some embodiments of the present application, with reference to FIG. 26, the pressing body 2 comprises two stacked bladders 21.

Specifically, in a thickness direction of the pressing body 2, the pressing body 2 comprises two stacked bladders 21. Optionally, at least one of the bladders 21 is a singled-sided bladder. For example, the two bladders 21 are both single-sided bladders, and the two single-sided bladders are arranged closely back to back, that is, a non-deformable rigid surface of one of the single-sided bladders is arranged closely to a non-deformable rigid surface of the other single-sided bladder, so that deformable flexible surfaces of the two single-sided bladders are each in contact with a battery cell S. Of course, in other embodiments, it is also possible that two double-sided bladders are stacked together to form the pressing body 2.

By configuring the pressing body 2 to comprise two stacked bladders 21, the thickness of the pressing body 2 can be increased by stacking the bladders 21, so as to adapt to battery cells S of different thicknesses and improve the compatibility of the tray 100 with different battery cells S.

According to some embodiments of the present application, with reference to FIG. 26, the pressing body 2 further comprises a partition plate 24. The partition plate 24 is sandwiched between the two bladders 21.

The partition plate 24 refers to a component for separating the two bladders 21. The material of the partition plate 24 may be, but is not limited to, plastic, metal, etc. Optionally, the pressing body 2 is detachably arranged on the tray body 1, for example, is inserted into the tray body 1, in this case, the two bladders 21 may be in insertion fit with the tray body 1, or the partition plate 24 and the two bladders 21 both may be in insertion fit with the tray body 1.

By providing the partition plate 24 between the two bladders 21, the thickness of the pressing body 2 is further increased by means of the partition plate 24 so as to adapt to battery cells S with smaller thicknesses. Moreover, since the partition plate 24 is sandwiched between the bladders 21, the thickness of the pressing body 2 can also be adjusted by withdrawing or replacing the partition plate 24, thereby improving the compatibility of the tray 100 with the battery cells S in different thickness ranges.

According to some embodiments of the present application, with reference to FIGS. 1 to 6 and FIGS. 13 to 17, the pressing body 2 is further provided with a first connecting portion 202. The first connecting portion 202 is connected to the tray body 1.

The first connecting portion 202 is a component for achieving connection and limiting. The first connecting portion 202 may be integrally or detachably connected to the tray body 1. Optionally, with reference to FIGS. 1 to 6, the pressing body 2 comprises a frame 211, and part of the frame 211 forms the first connecting portion 202. Optionally, with reference to FIGS. 13 to 17, the pressing body 2 comprises a frame 211. The frame 211 is provided with a first insert member 214, and the first insert member 214 forms the first connecting portion 202. Optionally, the first insert member 214 is an insert plate.

By connecting the first connecting portion 202 to the tray body 1, the pressing body 2 is connected to the tray body 1, preventing any movement of the pressing body 2 on the tray body 1, so that the battery cell S placed between two adjacent pressing bodies 2 is kept stable, reducing the influence of deviation of a single battery cell S on the positions of other battery cells S, and thus alleviating the problem of an electrode terminal of the battery cell S being misaligned with a probe on a production apparatus during the production of the battery cell S.

According to some embodiments of the present application, with reference to FIGS. 1 to 5 and FIGS. 13 to 22, the tray body 1 is provided with a plurality of first positioning portions 102 arranged at intervals, and the first connecting portions 202 are connected to the first positioning portions 102 in one-to-one correspondence.

The first positioning portion 102 refers to a component for limiting the orientation of an object connected thereto. Optionally, the plurality of first positioning portions 102 are arranged at equal intervals, and in this case, each battery cell S of the same model may be placed between two adjacent pressing bodies 2. Optionally, the spacings between the plurality of first positioning portions 102 are not equal, and in this case, each battery cell S of a different model may be placed between two adjacent pressing bodies 2.

By connecting the first connecting portions 202 to the first positioning portions 102 on the tray body 1 in one-to-one correspondence, the first positioning portions 102 are used to control the directions and positions of the pressing bodies 2 on the tray body 1, thereby achieving accurate control over a distance between two adjacent pressing bodies 2, and thus achieving control over the pressing pressures to the battery cell S placed between the two adjacent pressing bodies 2.

According to some embodiments of the present application, with reference to FIGS. 1 to 5 and FIGS. 13 to 22, the first connecting portions 202 are detachably connected to the tray body 1.

It can be understood that the first connecting portions 202 are detachably connected to the tray body 1, that is, the pressing bodies 2 may be unloaded from the tray body 1 according to requirements. Optionally, the first connecting portions 202 are in snap-fit connection with the tray body 1. Optionally, the first connecting portions 202 is connected to the tray body 1 in an inserted manner. Optionally, the first connecting portions 202 is threadedly connected to the tray body 1.

Optionally, the tray body 1 is provided with first positioning portions 102, and the first connecting portions 202 are detachably connected to the first positioning portions 102.

Optionally, referring to FIG. 4, the tray body 1 comprises a bottom plate 11, and a pair of end plates 13 and a pair of side plates 12 arranged on the bottom plate 11. The side plates 12 extend in the Y direction, and the end plates 13 extend in the X direction. The bottom plate 11, the pair of end plates 13 and the pair of side plates 12 jointly form a receiving cavity 14 in an enclosing manner, and the receiving cavity 14 is configured to receive the pressing bodies 2. In addition, the side plate 12 is further provided with first insertion grooves 121 extending in the Z direction. The first positioning portion 102 comprises the first insertion grooves 121. Furthermore, the pressing body 2 is a bladder 21. The bladder 21 comprises a frame 211 and a flexible skin 213, part of the frame 211 being inserted into the first insertion groove 121. It can be understood that part of the frame 211 inserted into the first insertion groove 121 forms the first connecting portion 202.

The pressing body 2 can be detachably connected to the tray body 1 by detachably connecting the first connecting portion 202 to the tray body 1, so that the compatibility of the tray 100 with different battery cells S can be improved by replacing the pressing body 2 to adapt to different types of battery cells S.

According to some embodiments of the present application, with reference to FIGS. 13 to 25, the first connecting portion 202 comprises first insert members 214. The first insert members 214 are arranged at two opposite ends of the pressing body 2 in the second direction. The first insert members 214 are in insertion fit with the tray body 1. The second direction is crossed with the first direction.

The first insert member 214 may be a component capable of achieving insertion fit and provided with an insertion hole, an insertion groove, an insert post, an insert plate, an insert strip, etc. It can be understood that if the first insert member 214 is provided with an insertion groove, the tray body 1 is provided with an insert plate or an insert strip for insertion fit with the insertion groove.

The first insert members 214 are arranged at two opposite ends of the pressing body 2 in the second direction, and it can be understood that two ends of the pressing body 2 in the second direction are respectively connected to the tray body 1 in an inserted manner, and two sides of the pressing body 2 in the first direction are respectively used for pressing the battery cell S. Optionally, the first direction and the second direction are perpendicular to each other. Optionally, the first direction is the Y direction, and the second direction is the X direction.

Optionally, the tray body 1 is provided with a first positioning portion 102, and the first insert member 214 is in insertion fit with the first positioning portion 102.

Optionally, referring to FIGS. 15, 16, 22 and 25, the tray body 1 comprises a bottom plate 11, and a pair of end plates 13 and a pair of side plates 12 arranged on the bottom plate 11. The side plates 12 extend in the Y direction, and the end plates 13 extend in the X direction. The bottom plate 11, the pair of end plates 13 and the pair of side plates 12 jointly form a receiving cavity 14 in an enclosing manner. The tray body 1 further comprises a baffle 15. The baffle 15 is provided in the receiving cavity 14 and divides the receiving cavity 14 into two receiving sub-cavities 141, and the receiving sub-cavities 141 are configured to receive the pressing bodies 2. The baffle 15 is further provided with second insertion grooves 151 extending in the Z direction. The first positioning portion 102 comprises second insertion grooves 151. Furthermore, the pressing body 2 is a bladder 21. The bladder 21 comprises a frame 211 and a flexible skin 213. First insert members 214 are further provided at two ends of the frame 211 in the X direction. The first insert members 214 are inserted into the second insertion grooves 151. Optionally, a fourth weight-reducing hole 2141 is formed in the first insert member 214.

By arranging the first insert members 214 at the two opposite ends of the pressing body 2 in the second direction, the pressing body 2 is in insertion fit with the tray body 1, thereby facilitating the replacement of the pressing body 2.

Figure 22:
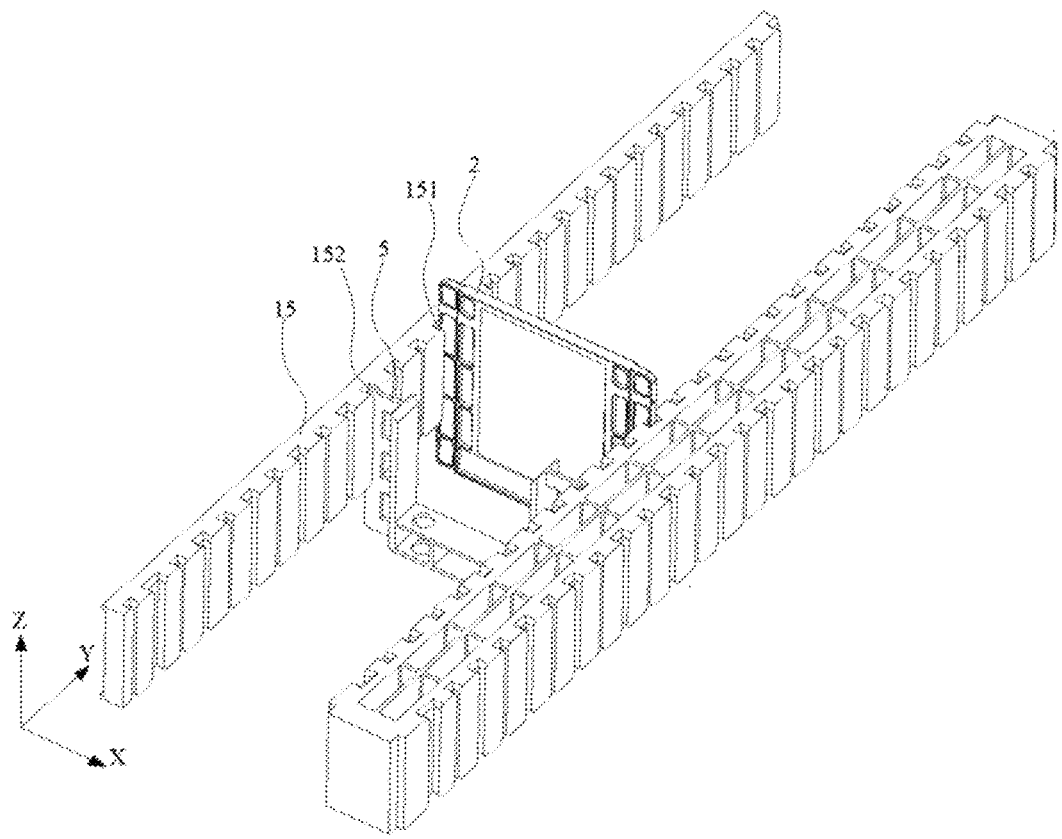
FIG. 22 is a schematic structural perspective view of a baffle in a tray provided in another embodiment of the present application.
Figure 23:
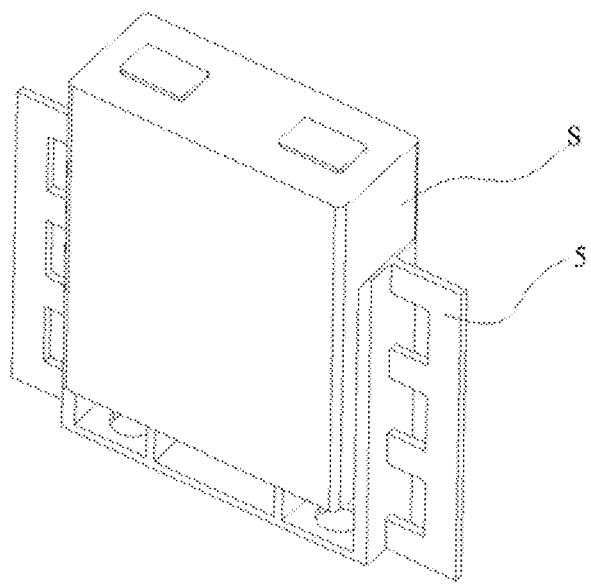
FIG. 23 is a first schematic structural perspective view of a carrier in a tray provided in another embodiment of the present application, showing a state where a battery cell is loaded on the carrier.
Figure 24:
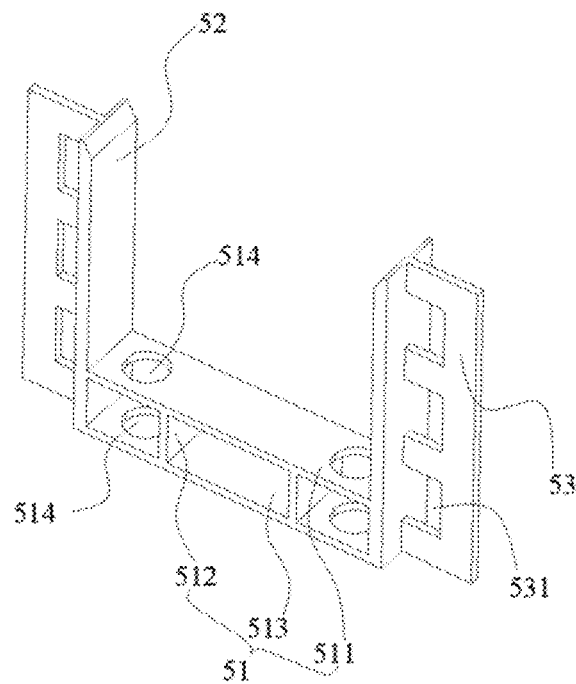
FIG. 24 is a second schematic structural perspective view of a carrier in a tray provided in another embodiment of the present application, showing a state where no battery cell is loaded on the carrier.

According to some embodiments of the present application, with reference to FIGS. 22 to 24, the tray 100 further comprises a plurality of carriers 5 arranged between two adjacent pressing bodies 2. The carrier 5 is configured to carry the battery cell S.

The carrier 5 refers to a component for supporting an object. Specifically, the carrier 5 in the present application is configured to carry the battery cell S. The carrier 5 may be, but is not limited to, U-shaped or L-shaped. The material of the carrier 5 may be, but is not limited to, metal or plastic.

By providing the carriers 5, the compatibility of the tray 100 with different battery cells S can be improved. For example, when a battery cell S has a larger size and may be directly loaded on the tray body 1, the battery cell S may be directly placed between two adjacent pressing bodies 2; whereas when a battery cell S has a smaller size, the battery cell S may be carried by the carriers 5, the carriers 5 being placed between the two adjacent pressing bodies 2. The carriers 5 can limit the battery cell S so as to prevent any movement of the battery cell S. Moreover, the carriers 5 lift and support the battery cell S so that the battery cell S can better correspond to the pressing bodies 2, facilitating restraint of the pressing bodies 2 to the battery cell S.

According to some embodiments of the present application, with reference to FIGS. 22 to 24, the carrier 5 comprises a bottom pad 51 and a pair of side pads 52. The pair of side pads 52 are respectively arranged upright at two ends of the bottom pad 51, and the bottom pad 51 and the side pads 52 form the U-shaped carrier 5.

It can be understood that the carrier 5 formed has a U-shaped receiving groove for receiving the battery cell S. An end opening of the U-shaped receiving groove is formed in the end of the carrier 5 away from the bottom pad 51, and the battery cell S may be loaded in the U-shaped receiving groove through the end opening. Two side openings of the U-shaped receiving groove are formed on two sides of the carrier 5, and the pressing bodies 2 can press the battery cell S received therein through the side openings. Optionally, the U-shaped receiving groove is adapted to the battery cell S.

The U-shaped carrier 5 is formed with the bottom pad 51 and the side pads 52, and the battery cell S is loaded by the U-shaped carrier 5 while the battery cell S is limited.

According to some embodiments of the present application, with reference to FIGS. 22 to 24, the bottom pad 51 comprises a first bottom pad 511 and a second bottom pad 512 that are provided parallel to each other and spaced from each other in a vertical direction, and a support rib 513 connected between the first bottom pad 511 and the second bottom pad 512. The ends of the first bottom pad 511 and the second bottom pad 512 on one side are connected to one of the side pads 52, and the ends of the first bottom pad 511 and the second bottom pad 512 on the other side are connected to the other side pad 52.

Optionally, the first bottom pad 511 and the second bottom pad 512 are two plates of the same size. The support rib 513 is supported between the first bottom pad 511 and the second bottom pad 512. One or a plurality of support plates 513 may be provided, and the term "a plurality of" refer to two or more, for example, three.

By configuring the bottom pad 51 to comprise the first bottom pad 511 and the second bottom pad 512 that are arranged in parallel and spaced from each other, the first bottom pad 511 and the second bottom pad 512 are connected to each other via the support rib 513, so that the bottom pad 51 can meet the requirement for a supporting height of the battery cell S, and the weight of the bottom pad 51 is also controlled.

According to some embodiments of the present application, with reference to FIGS. 22 to 24, the first bottom pad 511 and/or the second bottom pad 512 are provided with heat dissipation holes 514.

Optionally, the first bottom pad 511 is provided with heat dissipation holes 514. Optionally, the second bottom pad 512 is provided with heat dissipation holes 514. Optionally, the first bottom pad 511 and the second bottom pad 512 are both provided with heat dissipation holes 514.

By providing the first bottom pad 511 and/or the second bottom pad 512 with the heat dissipation holes 514, the heat dissipation effect of the carrier 5 is improved.

According to some embodiments of the present application, with reference to FIGS. 14 and 15 and FIGS. 22 to 24, the carrier 5 is further provided with a second connecting portion 501, and the second connecting portion 501 is configured to be connected to the tray body 1.

The second connecting portion 501 is also a component for achieving connection and limiting. The second connecting portion 501 may be integrally or detachably connected to the tray body 1. The second connecting portion 501 may also be an insert plate, a snap strip, a snap hole, etc. provided on the side pad 52, or even part of the side pad 52 forms the second connecting portion 501.

By connecting the second connecting portion 501 to the tray body 1, the carrier 5 is connected to the tray body 1, thereby preventing any movement of the carrier 5 on the tray body 1.

According to some embodiments of the present application, with reference to FIGS. 14 and 15 and FIGS. 22 to 24, the second connecting portions 501 are detachably connected to the tray body 1.

It can be understood that the second connecting portions 501 are detachably connected to the tray body 1, that is, the carriers 5 may be unloaded from the tray body 1 according to requirements. The detachable connection between the second connecting portion 501 and the tray body 1 includes, but it not limited to, insert connection, snap-fit connection, or threaded connection.

Optionally, with reference to FIGS. 14 and 15 and FIGS. 22 to 24, the carrier 5 comprises a bottom pad 51 and a pair of side pads 52. The pair of side pads 52 are each provided with a second insert member 53, the second insert member 53 forms a second connecting portion 501, and the second insert member 53 is in insertion fit with the tray body 1.

The carrier 5 can be detachably connected to the tray body 1 by detachably connecting the second connecting portion 501 to the tray body 1, so that the compatibility of the tray 100 with different battery cells S can be improved by replacing the carrier 5 to adapt to different types of battery cells S.

According to some embodiments of the present application, with reference to FIGS. 14 and 15 and FIGS. 22 to 24, the tray body 1 is provided with a plurality of second positioning portions 103 arranged at intervals, and the second connecting portions 501 are connected to the second positioning portions 103 in one-to-one correspondence.

The second positioning portion 103 also refers to a component for limiting the orientation of an object connected thereto. Optionally, the plurality of second positioning portions 103 are arranged at equal intervals. Optionally, the spacings between the plurality of second positioning portions 103 are not equal.

Optionally, the detachable connection between the second connecting portion 501 and the second positioning portion 103 includes, but it not limited to, insert connection, snap-fit connection, or threaded connection.

By connecting the second connecting portions 501 to the second positioning portions 103 on the tray body 1 in one-to-one correspondence, the directions and positions of the carriers 5 on the tray body 1 are controlled by using the second positioning portions 103, thereby achieving indirect control over the position of the battery cell S mounted on the carrier 5.

According to some embodiments of the present application, with reference to FIGS. 14 and 15 and FIGS. 22 to 24, the second connecting portion 501 comprises second insert members 53. The second insert member 53 are arranged at two opposite ends of the carrier 5 in the second direction crossed with the first direction, and the second insert members 53 are in insertion fit with the tray body 1.

Optionally, the second connecting portion 501 comprises the second insert members 53 arranged on the carrier 5. Optionally, the second insert member 53 is an insert plate. Optionally, the second insert member 53 is arranged on the side of the side pad 52 away from the bottom pad 51, that is, the side away from the U-shaped receiving groove. Optionally, a third weight-reducing hole 531 is further formed in the second insert member 53. The tray body 1 further comprises baffles 15. The baffles 15 are distributed at two opposite ends of the carrier 5 and extend in the first direction. The baffle 15 is provided with third insertion grooves 152, and the second insert member 53 is in insertion fit with the third insertion groove 152. The second positioning portion comprises third insertion grooves 152.

By providing the second insert members 53 at the two opposite ends of the carrier 5 in the second direction, the carrier 5 is in insertion fit with the tray body 1, thereby facilitating the replacement of the carrier 5.

According to some embodiments of the present application, with reference to FIGS. 4, 15 and 25, the tray body 1 further comprises a bottom plate 11, a pair of end plates 13 and a pair of side plates 12. The bottom plate 11, the pair of end plates 13 and the pair of side plates 12 form a receiving cavity 14 in an enclosing manner, and the receiving cavity 14 is configured to receive the pressing bodies 2 and the battery cell S.

Optionally, the tray body 1 is integrally formed. For example, when the tray body 1 is a plastic member, the bottom plate 11, the end plates 13, and the side plates 12 may be integrally formed directly during injection molding.

Optionally, the tray body 1 is an assembled member that is obtained by assembling and combining the separate bottom plate 11, end plates 13 and side plates 12 together.

It should be noted herein that the tray body 1 may comprise only the bottom plate 11 and the side plates 12 in other embodiments. For example, the side plates 12 are welded and fixed to the bottom plate 11, the pressing bodies 2 are inserted to the side plates 12, and the battery cell S is limited by using the pressing bodies 2 inserted to the side plates 12, preventing the battery cell S from being separated from the tray body 1, and in this case, the end plates 13 may be omitted. In some other embodiments, the tray body 1 may comprise only end plates 13 and side plates 12, the pressing bodies 2 are threadedly fixed to the side plates 12 while the battery cell S is supported by providing supporting steps on the side plates 12, and in this case, the bottom plate 11 may be omitted. In still other embodiments, the tray body 1 may also comprise only the end plates 13 and the bottom plate 11.

By providing the bottom plate 11, the end plates 13 and the side plates 12, the receiving cavity 14 for receiving the pressing bodies 2 and the battery cell S is formed in an enclosing manner, so that the structure is simple and is convenient to manufacture.

Figure 12:
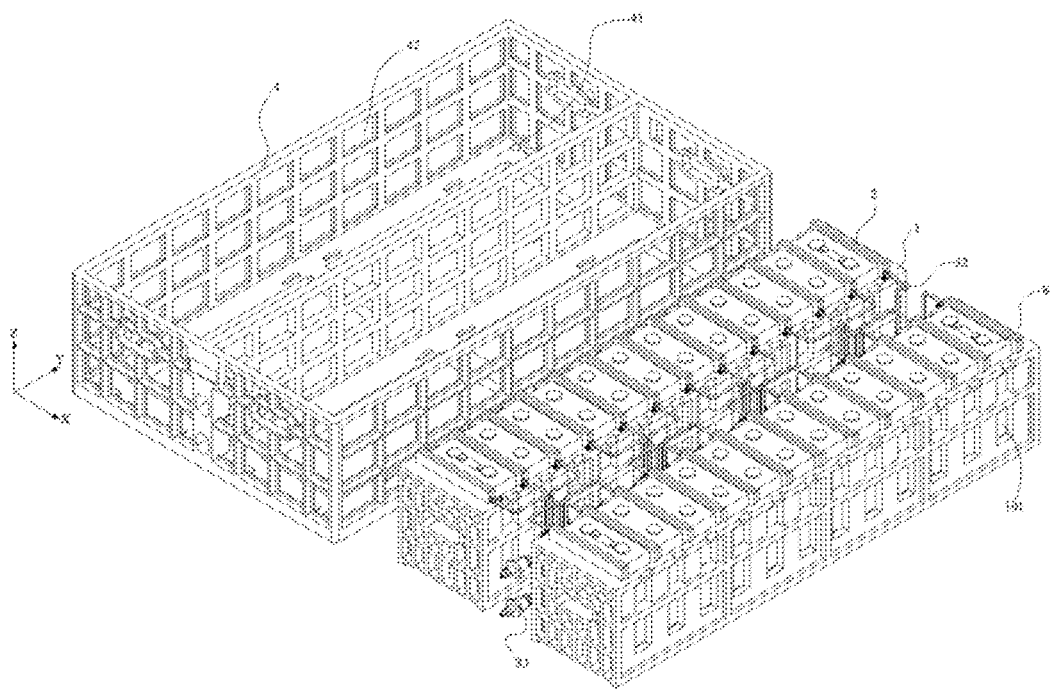
FIG. 12 is a schematic structural exploded view of a tray provided in an embodiment of the present application.

According to some embodiments of the present application, with reference to FIGS. 1 and 12, the tray 100 further comprises a box 4. The box 4 is provided with at least one mounting recess 41, and the tray body 1 is located in the mounting recess 41.

The box 4 refers to a container for loading the tray body 1. The material of the box 4 includes, but is not limited to, metal, plastic, etc. The mounting recess 41 refers to a space available for loading and receiving. The box 4 is provided with at least one mounting recess 41. For example, one mounting recess 41 or a plurality of mounting grooves 41 may be provided. The tray body 1 is located in the mounting recess 41, and one tray body 1 may be arranged in one mounting recess 41, or a plurality of tray bodies 1 may be arranged in one mounting recess 41, which will not be limited herein.

The tray body 1 is located in the mounting recess 41, consisting in either that the tray body 1 is integrally provided in the mounting recess 41, or that the tray body 1 is detachably arranged in the mounting recess 41.

Optionally, the mounting recess 41 is adapted to the tray body 1, and an inner wall of a cavity of the mounting recess 41 may be directly used for supporting and limiting the tray body 1.

Optionally, the capacity of the mounting recess 41 is greater than the volume of the tray body 1. In this case, when the tray body 1 is loaded in the mounting recess 41, a sufficient space is still left in the mounting recess 41, and other components, such as the fluid delivery assembly 3, can be received in the sufficient space. Optionally, a limiting block (not shown) for limiting the tray body 1 is further provided in the mounting recess 41.

By providing the box 4 to load the tray body 1, it is convenient to transfer and transport the tray body 1.

According to some embodiments of the present application, with reference to FIGS. 1 and 12, the tray body 1 is detachably arranged in the mounting recess 41.

The detachable arrangement means that the tray body 1 can be unloaded from the mounting recess 41 at any time. Optionally, the tray body 1 is snapped or inserted into the mounting recess 41.

By detachably mounting the tray body 1 in the mounting recess 41, replacement of the tray body 1 is facilitated to adapt to different battery cells S.

According to some embodiments of the present application, with reference to FIGS. 1 and 12, the box 4 is a non-metallic member.

It can be understood that the box 4 is made of a non-metallic material. Optionally, the box 4 is a plastic member.

By providing the box 4 as the non-metallic member, not only can the total weight of the tray 100 be reduced, the pressure of transportation be reduced, but also the manufacturing cost of the tray 100 can be reduced.

According to some embodiments of the present application, with reference to FIGS. 1 and 12, a second weight-reducing hole 42 is formed in the box 4.

The second weight-reducing hole 42 may be a blind hole or a through hole. Optionally, the second weight-reducing hole 42 is a through hole which is hollowed out in the box 4. Of course, in some embodiments, the second weight-reducing hole 42 may also be an inwardly-recessed blind hole in the box 4.

By providing the second weight-reducing hole 42, the total weight of the tray 100 can be reduced, and the pressure of transportation can be reduced.

According to some embodiments of the present application, with reference to FIGS. 15 and 25, the tray body 1 further comprises a baffle 15. The baffle 15 is located in the receiving cavity 14, and the baffle 15 extends in the first direction. The baffle 15 divides the receiving cavity 14 into at least two receiving sub-cavities 141, and the receiving sub-cavities 141 are configured to receive the pressing bodies 1 and the battery cell S.

The baffle 15 is integrally arranged in the receiving cavity 14 or is detachably arranged in the receiving cavity 14. Optionally, two ends of the baffle 15 are respectively connected to the end plates 13. Optionally, the baffle 15 is supported on the bottom plate 11. Optionally, the baffle 15 is connected to the side plate 12.

Optionally, a plurality of, for example, three, baffles 15 may be provided, and the plurality of baffles 15 are arranged at intervals. Of course, it is also possible to provide only one baffle 15, and in this case, the receiving cavity 14 is divided into two by the one baffle 15. Of course, the baffle 15 may uniformly divide the receiving cavity 14 into a plurality of receiving sub-cavities 141 of the same volume, and in this case, the sub-receiving cavities 141 may be configured to load the identical battery cells S. The baffle 15 may also divide the receiving cavity 14 into a plurality of receiving sub-cavities 141 of unequal volumes, and the receiving sub-cavities 141 of different volumes may be configured to load different battery cells S.

By dividing the receiving cavity 14 into the plurality of receiving sub-cavities 141 with the baffle 15, and by receiving the pressing bodies 1 and the battery cell S with the receiving sub-cavities 141, the tray body 1 has a simple structure and is easy to manufacture.

According to some embodiments of the present application, with reference to FIGS. 15 and 25, the baffle 15 is detachably arranged in the receiving cavity 14.

The detachable arrangement means that the baffle 15 can be unloaded from the receiving cavity 14 at any time. Optionally, the baffle 15 is snapped or inserted into the receiving cavity 14.

By detachably mounting the baffle 15 in the receiving cavity 14, the replacement of the baffle 15 is facilitated to adapt to different battery cells S.

According to some embodiments of the present application, with reference to FIGS. 15 and 25, the baffle 15 is connected to the end plate 13 in an inserted manner, and/or the baffle 15 is threadedly connected to the side plate 12.

Optionally, the baffle 15 comprises a plurality of sub-baffles arranged in the receiving cavity 14, and specifically comprises a pair of spaced first sub-baffles 1501 and a second sub-baffle 1502 arranged between the pair of first sub-baffles 1501. The first sub-baffles 1501 and the second sub-baffle 1502 are arranged in parallel. The first sub-baffle 1501 is attached to a surface of a respective side plate 12 and is threadedly connected to the side plate 12. For example, the first sub-baffle 1501 is connected together to the side plate 12 by means of screws. Two ends of the second sub-baffle 1502 are respectively connected to the end plates 13 in an inserted manner. Specifically, the end plate 13 is provided with an insertion groove 133, and an end portion of the second sub-baffle 1502 is inserted into the insertion groove 133.

Optionally, the baffle 15 comprises only a second sub-baffle 1502 arranged in the receiving cavity 14. Two ends of the second sub-baffle 1502 are respectively connected to the end plates 13 in an inserted manner.

By arranging the baffle 15 in the receiving cavity 14 with an inserted or threaded connection, the operation is simple, and the reliability is also high.

According to some embodiments of the present application, the bottom plate 11 comprises a bottom frame (not shown) in which a plurality of transverse beams (not shown) and a plurality of longitudinal beams (not shown) extending in the first direction are provided. The plurality of longitudinal beams are connected between the plurality of transverse beams and between the plurality of transverse beams and the bottom frame.

According to some embodiments of the present application, with reference to FIGS. 1 to 25, the embodiments of the present application further provide a method for using a tray 100. The tray 100 is configured to carry a battery cell S. The tray 100 comprises a tray body 1 and a plurality of bladders 21. The plurality of bladders 21 are arranged at intervals in a first direction. The bladders 21 are arranged on the tray body 1. The battery cell S is placed between two adjacent bladders 21. The bladder 21 is configured to be in contact with the battery cell S so as to press the battery cell S. The bladder 21 is provided with a bladder cavity 22 capable of being filled with a fluid medium and a bladder opening 23 in communication with the bladder cavity 22. The method for using a tray 100 comprises: a step S10 of inserting a battery cell S between two adjacent bladders 21; and a step S20 of filling the bladder cavity 22 with a fluid medium through the bladder opening 23 such that the bladder 21 is in contact with the battery cell S.

In step S10, the way of inserting the battery cell S between two adjacent bladders 21 may be a manual placement or a machine-aided automatic placement.

In step S20, optionally, the fluid medium is optionally a gas. For example, the gas is fed, by using a gas pump, into the bladder cavity 22 through the bladder opening 23. When the bladder cavity 22 is filled with the fluid medium through the bladder opening 23, a pressing force of the bladder 21 on the battery cell S can be controlled by regulating and controlling the flow rate and time of the fluid medium.

When the tray 100 is in use, the battery cell S can be restrained by simply placing the battery cell S between two adjacent bladders 21 and then filling the bladder cavities 22 with the fluid medium through the bladder openings 23, so that the operation is simple, and the reliability is high.

According to some embodiments of the present application, the method for using a tray 100 further comprises:

a step S30 of discharging the fluid medium filled in the bladder cavity 22 through the bladder opening 23 so as to release the pressing of the bladder 21 on the battery cell S; and a step S40 of taking out the battery cell S from between the two adjacent bladders 21.

In step S40, discharging the fluid medium filled in the bladder cavity 22 through the bladder opening 23 comprises simply opening the bladder opening 23 so that the fluid medium in the bladder cavity 22 automatically flows out under the effect of a pressure difference, or comprises suctioning the fluid medium out of the bladder cavity 22 through the bladder opening 23 using a suction apparatus.

When the tray 100 is in use, the battery cell S can be taken out only by discharging the fluid medium from the bladder cavities 22, so that the operation is simple, and the reliability is high.

According to some embodiments of the present application, the embodiments of the present application further provide a battery production apparatus, comprising the tray 100 described above.

Optionally, the battery production apparatus is a formation machine, that is, a machine for performing a formation treatment on a battery.

Optionally, the battery production apparatus is a capacity tester, that is, a machine for testing the capacity of a battery.

By using the tray 100, it is possible to flexibly press the battery cell S so as to decrease the dead space during pressing.

With reference to FIGS. 1 to 9, the embodiments of the present application provide a tray 100. The tray 100 comprises two tray bodies 1, twenty-six bladders 21, two fluid delivery assemblies 3 and one box 4. The box 4 has two mounting recesses 41, and the two tray bodies 1 are respectively inserted into the two mounting recesses 41 of the box 4. Each tray body 1 has a receiving cavity 14, and every thirteen bladders 21 are mounted in the receiving cavity 14 of one tray body 1.

Specifically, the tray body 1 is a plastic member. The tray body 1 comprises one bottom plate 11, two side plates 12 and two end plates 13. The bottom plate 11 extends in the Y direction, the two side plates 12 also extend in the Y direction and are respectively arranged on two sides of the bottom plate 11, and the two end plates 13 extend in the X direction and are respectively arranged at two ends of the bottom plate 11. In order to reduce the weight, the bottom plate 11, the side plates 12 and the end plates 13 are all provided with weight-reducing through holes. Each side plate 12 is correspondingly provided with thirteen first insertion grooves 121 extending in the Z direction, and the spacing between every two adjacent first insertion grooves 121 is set to the same. The thirteen bladders 21 are respectively inserted into the first insertion grooves 121 of the two side plates 12 and are accordingly arranged at equal intervals in the Y direction. A battery cell S is inserted between two adjacent bladders 21. The Y direction, the X direction and the Z direction are in a mutually perpendicular relationship.

Specifically, the bladder 21 is a gas bladder. The bladder 21 comprises a hollow frame 211, and frame openings on two sides of the frame 211 are covered by flexible skins 213, thereby forming a bladder cavity 22 inside the bladder 21. A laterally open bladder opening 23 is formed at the end of the frame 211 away from the bottom plate 11, and the bladder opening 23 is a through hole penetrating the frame 211 and connected to the bladder cavity 22. In detail, the frame 211 is a metal member, and the flexible skin 213 is a silicone member.

Specifically, the fluid delivery assembly 3 is a gas pipe assembly. The fluid delivery assembly 3 comprises a main channel 31 extending in the Y direction and thirteen sub-channels 32 in communication with the main channel 31. Outlets of the thirteen sub-channels 32 are respectively in communication with the bladder openings 23 of the thirteen bladders 21. One end of the main channel 31 is provided with a one-way valve 33, and the one-way valve 33 is configured to be connected to a gas source. The main channel 31 is fixed in the box 4, the one-way valve 33 penetrates the box 4, one end of the one-way valve 33 is in communication with the main channel 31, and the other end thereof passes out of the box 4. In detail, the one-way valve 33 is a valve core needle, the main channel 31 is a straight pipe, and the sub-channel 32 is an elbow pipe, and the straight pipe and the elbow pipe are connected to each other by means of a connector.

Specifically, the box 4 is a plastic basket. In order to reduce weight, the plastic basket is provided with a plurality of hollowed-out holes.

When the tray 100 is in use, the bladders 21 are inserted into the first insertion grooves 121 of the tray body 1, the battery cells S are each inserted between two adjacent bladders 21, and the bladder cavities 22 are then filled, by means of the one-way valve 33, with a gas through the bladder openings 23, so that the volumes of the bladders 21 expand and become larger, and the battery cells S are pressed. Thereafter, the bladder openings 23 are opened to discharge the gas from the bladder cavities 22, the volumes of the bladders 21 contract and become smaller, the pressing of the bladders 21 on the battery cells S is released, and the battery cells S can be each taken out from between two adjacent bladders 21.

When the loaded battery cells S are to be replaced, the bladders 21 may also be withdrawn from the tray body 1 and replaced with different bladders 21 so as to adapt to different battery cells S, or even the tray body 1 may be withdrawn from the box 4 and replaced with a different tray body 1 so as to adapt to different battery cells S.

With reference to FIGS. 13 to 25, the embodiments of the present application further provide a tray 100. The tray 100 comprises one tray body 1, twenty-six bladders 21, four fluid delivery assemblies 3 and twenty-four carriers 5. The tray body 1 has two receiving sub-cavities 141, and every thirteen bladders 21 and every twelve carriers 5 are mounted in one receiving sub-cavity 141.

Specifically, the tray body 1 is a plastic member. The tray body 1 comprises one bottom plate 11, two side plates 12, two end plates 13 and three baffles 15. The bottom plate 11 extends in the Y direction, the two side plates 12 also extend in the Y direction and are respectively arranged on two sides of the bottom plate 11, and the two end plates 13 extend in the X direction and are respectively arranged at two ends of the bottom plate 11. The bottom plate 11, the side plates 12 and the end plates 13 form a receiving cavity 14 in an enclosing manner. The three baffles 15 are arranged in the receiving cavity 14 and all extend in the Y direction, one of the baffles 15 is arranged in the middle of the receiving cavity 14 and two ends thereof are respectively inserted into the two end plates 13, so as to divide the receiving cavity 14 into two receiving sub-cavities 141; and the other two baffles 15 are attached to the side plates 12, and two ends thereof are also respectively inserted into the two end plates 13. Thirteen second insertion grooves 151 extending in the Z direction and twelve third insertion grooves 152 extending in the Z direction are correspondingly formed in the surface of each baffle 15. The second insertion grooves 151 and the third insertion grooves 152 are arranged alternately, the spacing between every two adjacent second insertion grooves 151 is set to the same, and the spacing between every two adjacent third insertion grooves 152 is set to the same. The thirteen bladders 21 are respectively inserted into the second insertion grooves 121 of the two baffles 15 and are accordingly arranged in the receiving sub-cavities 141 at equal intervals in the Y direction. The twelve carriers 5 are respectively inserted into the third insertion grooves 152 of the two baffles 15 and are accordingly arranged in the receiving sub-cavity 141 at equal intervals in the Y direction, and each carrier 5 is arranged between two adjacent bladders 21. The Y direction, the X direction and the Z direction are in a mutually perpendicular relationship.

Specifically, the bladder 21 is a gas bladder. The bladder 21 comprises a hollow frame 211, and frame openings on two sides of the frame 211 are covered by flexible skins 213, thereby forming a bladder cavity 22 inside the bladder 21. Two laterally open bladder openings 23 are formed at the end of the frame 211 away from the bottom plate 11, and the bladder openings 23 are through holes penetrating the frame 211 and connected to the bladder cavity 22. In addition, the side of the frame 211 facing away from the bladder cavity 22 is integrally formed with a first insert member 214. The first insert member 214 is inserted into the second insertion groove 151. In detail, the frame 211 and the first insert member 214 are metal members, and the flexible skins 213 are silicone members.

Specifically, the fluid delivery assembly 3 is a gas pipe assembly. The fluid delivery assembly 3 comprises a main channel 31 extending in the Y direction and thirteen sub-channels 32 in communication with the main channel 31. Outlets of the thirteen sub-channels 32 are respectively in communication with the bladder openings 23 of the thirteen bladders 21. One end of the main channel 31 is provided with a one-way valve 33, and the one-way valve 33 is configured to be connected to a gas source. The main channel 31 is fixed to the tray body 1, and specifically, two ends of the main channel 31 are respectively connected to the end plates 13. Moreover, the one-way valve 33 penetrates the end plate 13, one end of the one-way valve 33 is in communication with the main channel 31, and the other end thereof passes out of the box 4. More specifically, the end plate 13 is provided with a first blind hole 131 and a second blind hole 132 that are in communication with each other, the first blind hole 131 extends in the Y direction and is in communication with the main channel 31, the second blind hole 132 extends in the Y direction, and the one-way valve 33 is mounted on the second blind hole 132. In detail, the one-way valve 33 is a valve core needle, the main channel 31 is a straight pipe, and the sub-channel 32 is an elbow pipe, and the straight pipe and the elbow pipe are connected to each other by means of a connector.

Specifically, the carrier 5 comprises a bottom pad 51 and a pair of side pads 52. The pair of side pads 52 are respectively arranged upright at two ends of the bottom pad 51, and the bottom pad 51 and the side pads 52 form the U-shaped carrier 5. The bottom pad 51 comprises a first bottom pad 511 and a second bottom pad 512 that are provided parallel to each other and spaced from each other in a vertical direction, and a support rib 513 connected between the first bottom pad 511 and the second bottom pad 512. The ends of the first bottom pad 511 and the second bottom pad 512 on one side are connected to one of the side pads 52, and the ends of the first bottom pad 511 and the second bottom pad 512 on the other side are connected to the other side pad 52. The first bottom pad 511 and the second bottom pad 512 are provided with heat dissipation holes 514. The carrier 5 is further provided with second insert members 53. Specifically, the second insert member 53 is arranged on the side of the side pad 52 away from the bottom pad 51, and the second insert member 53 is in insertion fit with the third insertion groove 152.

When the tray 100 is in use, the bladders 21 and the carriers 5 are first respectively inserted into the second insertion grooves 151 and the third insertion grooves 152 of the tray body 1, the battery cells S are then respectively inserted into the carriers 5, and the bladder cavities 22 are then filled, by means of the one-way valve 33, with a gas through the bladder openings 23, so that the volumes of the bladders 21 expand and become larger, and the battery cell S is pressed. Thereafter, the bladder openings 23 are opened to discharge the gas from the bladder cavities 22, the volumes of the bladders 21 contract and become smaller, the pressing of the bladders 21 on the battery cells S is released, and the battery cells S can be each taken out from the carriers 5.

When the loaded battery cells S are to be replaced, the carriers 5 may be withdrawn from the tray body 1 and replaced with different carriers 5 so as to adapt to different battery cells S, or the bladders 21 may be withdrawn from the tray body 1 and replaced with different bladders 21 so as to adapt to different battery cells S, or even the baffles 15 may be withdrawn and replaced with different baffles 15 so as to adapt to different battery cells S.

The foregoing description is merely illustrative of the optional embodiments of the present application, and is not intended to limit the present application. Various changes and variations may be made to the present application for a person skilled in the art. Any modification, equivalent replacement, improvement, and the like made within the spirit and principles of the present application should fall within the scope of protection of the present application.

The invention claimed is:

1. A tray for carrying a battery cell, comprising:
   a tray body including a bottom plate, side plates, and end plates; and
   a plurality of pressing bodies arranged at intervals in a first direction, wherein the pressing bodies are arranged on the tray body, the battery cell is placed between two adjacent pressing bodies, and each of the pressing bodies is provided with a flexible pressing portion configured to be in contact with the battery cell so as to press the battery cell,
   wherein each of the pressing bodies comprises at least one deformable bladder filled with a medium, which is liquid or solid at a normal temperature,
   the bladder is internally provided with a bladder cavity capable of being filled with the medium, and the bladder is further provided with a bladder opening in communication with the bladder cavity,
   the tray body avoids the bladder opening, and the bladder opening is higher than the tray body,
   the bladder opening is formed in at least one end surface of the bladder facing one of the side plates, the side plates are distributed at opposite end surfaces of the bladder, and the bladder opening is higher than the one of the side plates facing the bladder opening, and
   the bladder comprises a rigid frame and a flexible skin for covering a frame opening on at least one side of the frame, wherein the frame and the flexible skin form the bladder cavity in an enclosing manner, and the flexible skin is formed as the flexible pressing portion.

2. The tray according to claim 1, wherein the rigid frame comprises a border structure surrounding the bladder cavity, and the bladder opening is located in a surface of the frame facing the one of the side plates and makes the bladder cavity open.

3. The tray according to claim 1, wherein the tray further comprises a fluid delivery assembly in communication with the bladder cavity, wherein the fluid delivery assembly is arranged in the first direction.

4. The tray according to claim 3, wherein the fluid delivery assembly comprises a main channel and a plurality of sub-channels, wherein the plurality of sub-channels are each in communication with the main channel, and the sub-channels are in communication with the bladder cavities in one-to-one correspondence.

5. The tray according to claim 4, wherein at least one end of the main channel is provided with a one-way valve.

6. The tray according to claim 3, wherein the fluid delivery assembly is located on one side of the bladder in a second direction crossed with the first direction.

7. The tray according to claim 6, wherein the tray further comprises a box, wherein the tray body is located in the box, and the fluid delivery assembly is located outside the tray body and fixed to the box, and the tray body is provided with a receiving cavity, a receiving sub-cavity is further formed in the receiving cavity, the bladder is located in the receiving sub-cavity, and the fluid delivery assembly is fixed in the receiving cavity but located outside the receiving sub-cavity.

8. The tray according to claim 1, wherein the pressing body comprises two stacked bladders, and the pressing body further comprises a partition plate sandwiched between the two bladders.

9. The tray according to claim 1, wherein the pressing body is further provided with a first connecting portion connected to the tray body,
   the tray body is provided with a plurality of first positioning portions arranged at intervals,
   the first connecting portions are connected to the first positioning portions in one-to-one correspondence,
   the first connecting portion is detachably connected to the tray body,
   the first connecting portion comprises first insert structures, wherein the first insert structures are arranged at two opposite ends of the pressing body in a second direction crossed with the first direction, and the first insert structures are in insertion fit with the tray body, and and the first direction and the second direction are perpendicular to each other.

10. The tray according to claim 1, wherein the tray further comprises a plurality of carriers arranged between two adjacent pressing bodies, wherein the carrier is configured to carry the battery cell, the carrier comprises a bottom pad and a pair of side pads arranged upright at two ends of the bottom pad, wherein the side pads and the bottom pad form the U-shaped carrier, the bottom pad comprises a first bottom pad and a second bottom pad that are arranged parallel to each other and spaced from each other in a vertical direction, and a support rib connected between the first bottom pad and the second bottom pad, wherein the ends of the first bottom pad and the second bottom pad on one side are connected to one of the side pads, and the ends of the first bottom pad and the second bottom pad on the other side are connected to the other side pad, and the first bottom pad and/or the second bottom pad are provided with heat dissipation holes each having an opening facing toward a bottom of the battery cell in the vertical direction.

11. The tray according to claim 10, wherein the carrier is further provided with a second connecting portion configured to be connected to the tray body, the tray body is provided with a plurality of second positioning portions arranged at intervals, and the second connecting portions are connected to the second positioning portions in one-to-one correspondence, the second connecting portion is detachably connected to the tray body, and the second connecting portion comprises second insert structures, wherein the second insert structures are arranged at two opposite ends of the carrier in a second direction crossed with the second direction, and the second insert structures are in insertion fit with the tray body.

12. The tray according to claim 1, wherein the side plates, the end plates and the bottom plate form, in an enclosing manner, a receiving cavity for receiving the pressing bodies and the battery cell, the tray further comprises a box, wherein the box is provided with at least one mounting recess, and the tray body is located in the mounting recess, and the tray body is detachably arranged in the mounting recess; and/or the box is a non-metallic member; and/or a second weight-reducing hole is formed in the box.

13. The tray according to claim 12, wherein the tray body further comprises a baffle located in the receiving cavity and extending in the first direction, wherein the baffle divides the receiving cavity into at least two receiving sub-cavities configured to receive the pressing bodies and the battery cell, the baffle is detachably arranged in the receiving cavity, and the baffle is connected to the end plate in an inserted manner; and/or the baffle is threadedly connected to the side plate.

14. A battery production apparatus, comprising the tray of claim 1.

15. The tray according to claim 1, wherein the bladder opening is formed in at least one end of the bladder, the side plates are distributed at opposite ends of the bladder, and the bladder opening is higher than at least one of the side plates facing the bladder opening.

16. A method for using a tray according to claim 1 configured to carry a battery cell, the method for using the tray comprises:

inserting the battery cell between two adjacent bladders; and filling the bladder cavity with a fluid medium through the bladder opening such that the bladder is in contact with the battery cell.

17. The method for using a tray according to claim 16, characterized by further comprising:

discharging the fluid medium filled in the bladder cavity through the bladder opening so as to release the pressing of the bladder on the battery cell; and taking out the battery cell from between the two adjacent bladders.

* * * * *